(12) United States Patent
Gadnis et al.

(10) Patent No.: US 12,244,719 B1
(45) Date of Patent: Mar. 4, 2025

(54) COMPUTER-IMPLEMENTED AUTHENTICATION PLATFORM

(71) Applicant: BanQu, Inc., Minnetonka, MN (US)

(72) Inventors: Ashish Gadnis, Austin, TX (US); Jeffrey A. Keiser, Minnetonka, MN (US); Michael Linton, St. Paul, MN (US); Stanislav S. Natalenko, Kharkov (UA)

(73) Assignee: BanQu, Inc., Minnetonka, MN (US)

( * ) Notice: Subject to any disclaimer, the term of this patent is extended or adjusted under 35 U.S.C. 154(b) by 0 days.

(21) Appl. No.: 18/815,573

(22) Filed: Aug. 26, 2024

Related U.S. Application Data

(63) Continuation of application No. 15/767,969, filed as application No. PCT/US2016/054920 on Sep. 30, 2016, now abandoned.

(60) Provisional application No. 62/495,574, filed on Oct. 17, 2015.

(51) Int. Cl.
*H04L 9/32* (2006.01)

(52) U.S. Cl.
CPC .......... *H04L 9/3231* (2013.01); *H04L 9/3213* (2013.01)

(58) Field of Classification Search
CPC .............................. H04L 9/3231; H04L 9/3213
See application file for complete search history.

(56) References Cited

U.S. PATENT DOCUMENTS

| 7,669,760 B1 | 3/2010 | Zettner |
| 8,572,711 B1 * | 10/2013 | Klau ................ H04L 63/0807 726/29 |
| 9,397,985 B1 * | 7/2016 | Seger, II ............. H04L 63/0442 |
| 2008/0127296 A1 | 5/2008 | Carroll et al. |
| 2011/0137789 A1 * | 6/2011 | Kortina ................ G06Q 20/384 705/38 |

(Continued)

FOREIGN PATENT DOCUMENTS

| GB | 2540975 | 2/2017 |
| KR | 10-2021-0030534 | 3/2021 |

OTHER PUBLICATIONS

Communication under Rule 71(3) EPC, dated Jan. 9, 2024, issued by the European Patent Office, Patent Application No. 16855952.4 (70 pages).

(Continued)

*Primary Examiner* — Henry Tsang
(74) *Attorney, Agent, or Firm* — Klarquist Sparkman, LLP

(57) ABSTRACT

Systems, methods, and computer-readable media for computer-implemented authentication platforms are described herein. In an example approach, a user is enrolled in a computer-implemented authentication platform. The enrollment process includes digitally encrypting an image of a user, storing the digitally encrypted image of the user in a blockchain as part of a user profile of the user, generating (using the digitally encrypted image of the user) an identifier of the user, and storing the identifier of the user in the blockchain as part of the user profile of the user. Subsequently, the user is authenticated. The authentication process includes retrieving the digitally encrypted image of the user from the blockchain (using the identifier of the user to retrieve the digitally encrypted image of the user) and decrypting the digitally encrypted image of the user using a decryption token.

15 Claims, 27 Drawing Sheets

(56) References Cited

U.S. PATENT DOCUMENTS

| | | | |
|---|---|---|---|
| 2013/0204787 A1* | 8/2013 | Dubois | G06Q 20/40 |
| | | | 705/44 |
| 2015/0332276 A1 | 11/2015 | Hosp | |
| 2016/0132863 A1 | 5/2016 | Dodin | |
| 2016/0260169 A1 | 9/2016 | Arnold et al. | |
| 2017/0046806 A1 | 2/2017 | Haldenby et al. | |
| 2019/0288854 A1 | 9/2019 | Xie et al. | |

OTHER PUBLICATIONS

Communication under Rule 71(3) EPC, dated Apr. 15, 2024, issued by the European Patent Office, Patent Application No. 16855952.4 (69 pages).

European Search Report dated Apr. 23, 2024, from European Patent Application No. 24160651.6, 6 pp.

European Search Report dated Apr. 23, 2024, from European Patent Application No. 24160636.7, 6 pp.

Examination Report dated Jan. 20, 2023, from ARIPO Patent Application No. AP/P/2018/010608, 4 pp.

Kosba et al., "Hawk: The Blockchain Model of Cryptography and Privacy-Preserving Smart Contracts," IEEE Symposium on Security and Privacy, 20 pp. (2016).

Notice of Acceptance dated Jun. 5, 2022, from Qatar Patent Application No. QA/201803/00126, 2 pp. [No English translation].

Notice of Allowance dated Oct. 9, 2024, from Vietnamese Patent Application No. 1-2018-01522, 2 pp.

Office Action dated Apr. 26, 2023, from Colombian Patent Application No. NC2023/0004933, 10 pp.

Office Action dated Aug. 26, 2022, from Vietnamese Patent Application No. 1-2018-01522, 4 pp.

Office Action dated Apr. 13, 2023, from Vietnamese Patent Application No. 1-2018-01522, 2 pp.

Office Action dated Aug. 28, 2023, from Brazilian Patent Application No. BR112018007449-7, in Portuguese and with an informal English translation (5 pages).

Office Action dated Aug. 9, 2022, from Mexican Patent Application No. MX/a/2018/004693, 6 pp. [No English translation].

Office Action dated Mar. 17, 2023, from Mexican Patent Application No. MX/a/2018/004693, 10 pp. [No English translation].

Office Action dated Dec. 7, 2023, from Mexican Patent Application No. MX/a/2018/004693, 5 pp. [No English translation].

Office Action dated Apr. 2, 2024, from U.S. Appl. No. 17/698,908, 37 pp.

Substantive Examination Report dated Oct. 3, 2024, from Philippines Patent Application No. 1-2018-550046, 7 pp.

Patent Certificate dated Dec. 3, 2024, from Colombian Patent Application No. NC2018/0004808, 2 pp.

Resolution of Grant dated Oct. 29, 2024, from Colombian Patent Application No. NC2018/0004808, 6 pp.

Subsequent Substantive Examination Report dated Jan. 3, 2025, from Philippines Patent Application No. 1-2018-550046, 5 pp.

* cited by examiner

COMPUTER-IMPLEMENTED AUTHENTICATION PLATFORM

RELATED APPLICATIONS INFORMATION

This application is a continuation of U.S. patent application Ser. No. 15/767,969, filed Apr. 12, 2018, which is a U.S. National Stage of International Application No. PCT/US2016/054920, filed Sep. 30, 2016, which was published in English under PCT Article 21 (2). International Application No. PCT/US2016/054920 claims the benefit of U.S. Provisional Application No. 62/495,574, filed Oct. 17, 2015.

SUMMARY

Examples described herein relate to computer-implemented authentication platforms. In an example approach, a user is enrolled in a computer-implemented authentication platform. As part of the enrollment process, a user profile of the user is established. Specifically, the enrollment process includes receiving an image of the user, digitally encrypting the image of the user, storing the digitally encrypted image of the user in a blockchain as part of the user profile of the user, generating (using the digitally encrypted image of the user) an identifier of the user, and storing the identifier of the user in the blockchain as part of the user profile of the user. Subsequently, the user is authenticated in the computer-implemented authentication platform. The authentication process includes receiving the identifier of the user, generating first authentication data, transmitting the first authentication data to a mobile device of the user, receiving a first indication that the authentication data has been provided to a verification agent computing device, verifying that the first indication matches the first authentication data, and, in response, retrieving the digitally encrypted image of the user from the blockchain (using the identifier of the user to retrieve the digitally encrypted image of the user). The authentication process further includes requesting a decryption token from an encryption service, receiving, from the encryption service, the decryption token, and decrypting the digitally encrypted image of the user using the decryption token. Finally, the authentication process includes transmitting the decrypted image of the user to the verification agent computing device, receiving user input or a result of an image analysis process confirming that the decrypted image of the user matches a person in the presence of the verification agent, generating second authentication data, transmitting the second authentication data to the mobile device of the user, receiving a second indication that the second authentication data has been provided to the verification agent computing device, and verifying that the second indication matches the second authentication data.

In another example approach, a user is enrolled in a computer-implemented authentication platform. As part of the enrollment, a user profile of the user is established. Specifically, the enrollment process includes receiving identity information of the user, digitally encrypting the identity information of the user, storing the digitally encrypted identity information of the user in a blockchain as part of the user profile of the user, generating (using the digitally encrypted identity information of the user) an identifier of the user, and storing the identifier of the user in the blockchain as part of the user profile of the user. Subsequently, the user is authenticated in the computer-implemented authentication platform. The authentication process includes receiving the identifier of the user, generating first authentication data, transmitting the first authentication data to a mobile device of the user, receiving a first indication that the authentication data has been provided to a verification agent computing device, verifying that the first indication matches the first authentication data, and, in response, retrieving the digitally encrypted identity information of the user from the blockchain (using the identifier of the user to retrieve the digitally encrypted identity information of the user). The authentication process further includes decrypting the digitally encrypted identity information of the user using a decryption token. Finally, the authentication process includes transmitting the decrypted identity information of the user to the verification agent computing device, receiving input confirming that the decrypted identity information of the user matches identity information of a person in the presence of the verification agent, generating second authentication data, transmitting the second authentication data to the mobile device of the user, receiving a second indication that the second authentication data has been provided to the verification agent computing device, and verifying that the second indication matches the second authentication data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

Using the systems, methods, and computer-readable media described herein, a blockchain-based identity and transaction platform can be implemented. People can enroll as users in the platform using identity information such as an image or photo (e.g., of the person's face). Once a user profile has been established, the user can form user relationships with other users of the platform and perform transactions. The identity information, user relationships, transactions, and other information are stored in blocks in a blockchain. Unlike conventional approaches in which a user's information is stored and maintained on centralized server computers managed by many different entities and stored behind entity-specific firewalls, each of which may be vulnerable to security threats, the blockchain-based identity and transaction platform examples described herein provide secure storage of an individual's information through a distributed network of computers.

The example blockchain-based identity and transaction platforms also allow a person to integrate various types of information to create a blockchain-based identity. The blockchain-based identity can be used to establish the qualifications and background of the person. As an example, an individual may not have access to institutions and entities. A blockchain-based identity established through a blockchain-based identity and transaction platform can provide evidence that helps identify the person. Because of the distributed nature of a blockchain, such a blockchain-based identity is both portable and accessible regardless of the situation in a user's current location. Examples are described below with reference to FIGS. 1-27.

Figure 1:
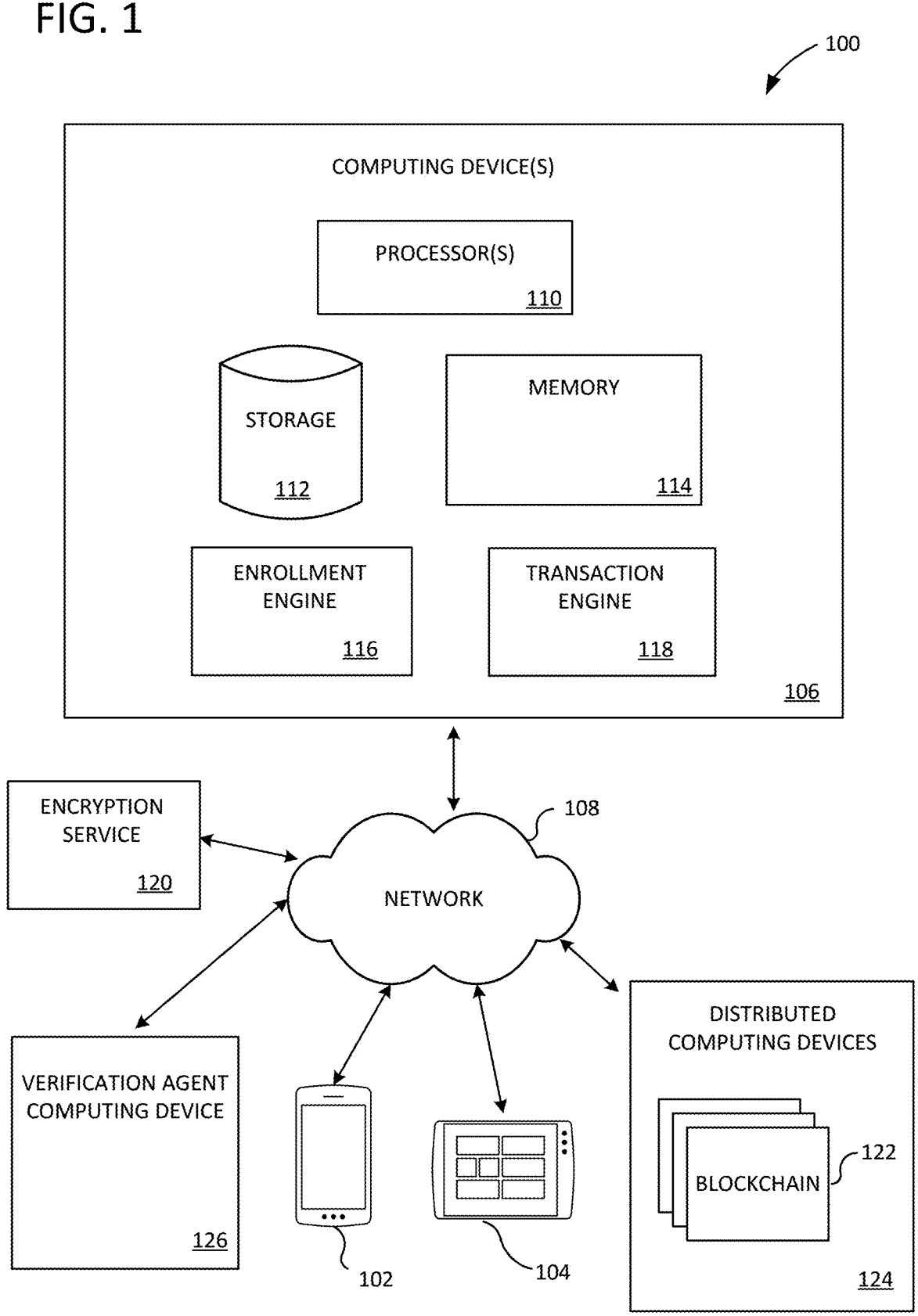
FIG. 1 is a block diagram of an example environment in which a blockchain-based identity and transaction platform can be implemented.

FIG. 1 illustrates an example environment 100 in which a blockchain-based identity and transaction platform can be implemented. As used herein, "blockchain" refers to a distributed storage platform and network in which individual "blocks" are connected in a chain. Each block is linked to the previous block in the blockchain by, for example, including a hash of the previous block as a "proof of work." Various hash functions, including functions in the Secure Hash Algorithm (SHA)-1 or -2 families, such as SHA-256, can be used to perform a one-way hash. For a one-way hash, it is generally considered to be impossible or impractical to generate the input (the "message") to the hash function based on the output (the "message digest" or "digest") of the hash function.

In a blockchain, the individual blocks can store a variety of data that may or may not be related (e.g., may or may not be associated with a same user). In environment 100, mobile computing devices 102 and 104 are in communication with computing device(s) 106 over a network 108. Network 108 can be the Internet, a Local Area Network (LAN), a Wireless Local Area Network (WLAN), a Wide Area Network (WAN), or other type of network, wired or wireless. Computing device(s) 106 can be, for example, one or more server computers. Computing device(s) 106 includes processor(s) 110, local storage 112, and memory 114. Environment 100 can also include one or more additional computing devices, such as desktop computers, (not shown) in communication with computing devices(s) 106 over network 108.

Computing device(s) 106 also includes an enrollment engine 116 and a transaction engine 118. Enrollment engine 116 is configured to enroll, by processor(s) 110, a person as a user in the blockchain-based identity and transaction platform based on identity information for the person. As an example, a person can use mobile computing device 102 (or other computing device, such as a desktop computer) to enter a name, identification number, etc. and/or to take an image (e.g., a "selfie") of themselves and, using a web application or using client-side software installed on mobile computing device 102, upload the image and/or other information to computing device(s) 106 as the identity information. Example software user interfaces are illustrated in FIGS. 8-23. Enrollment engine 116 is configured to create a unique identifier for the person based on the uploaded identity information. The identity information can be encrypted, either by computing device(s) 106 or through an encryption service 120. Encryption services are discussed in more detail below. The encrypted identity information can then be stored in a blockchain 122. Blockchain 122 is implemented on a group of distributed computing devices 124 that are accessible via network 108. Additional enrollment examples are discussed in detail below with respect, e.g., to FIG. 4.

Transaction engine 118 is configured to authorize, by processor(s) 110, transactions between users who are in a user relationship. User relationships can be established, for example, by request or invitation of a user and an acceptance by another user. Transactions can be authorized, at least in part, through interaction with a verification agent computing device 126. Verification agent computing device 126 communicates with computing device(s) 106 through network 108. As an example, a first user can initiate a transfer to a second user through a web application or through client-side software. Transaction engine 118 can be configured to perform a verification of the transfer using, for example, a multi-stage verification approach that accesses information stored in blockchain 122. Transaction verification examples are discussed in detail below with respect, e.g., to FIGS. 5, 6, and 7.

Figure 2:
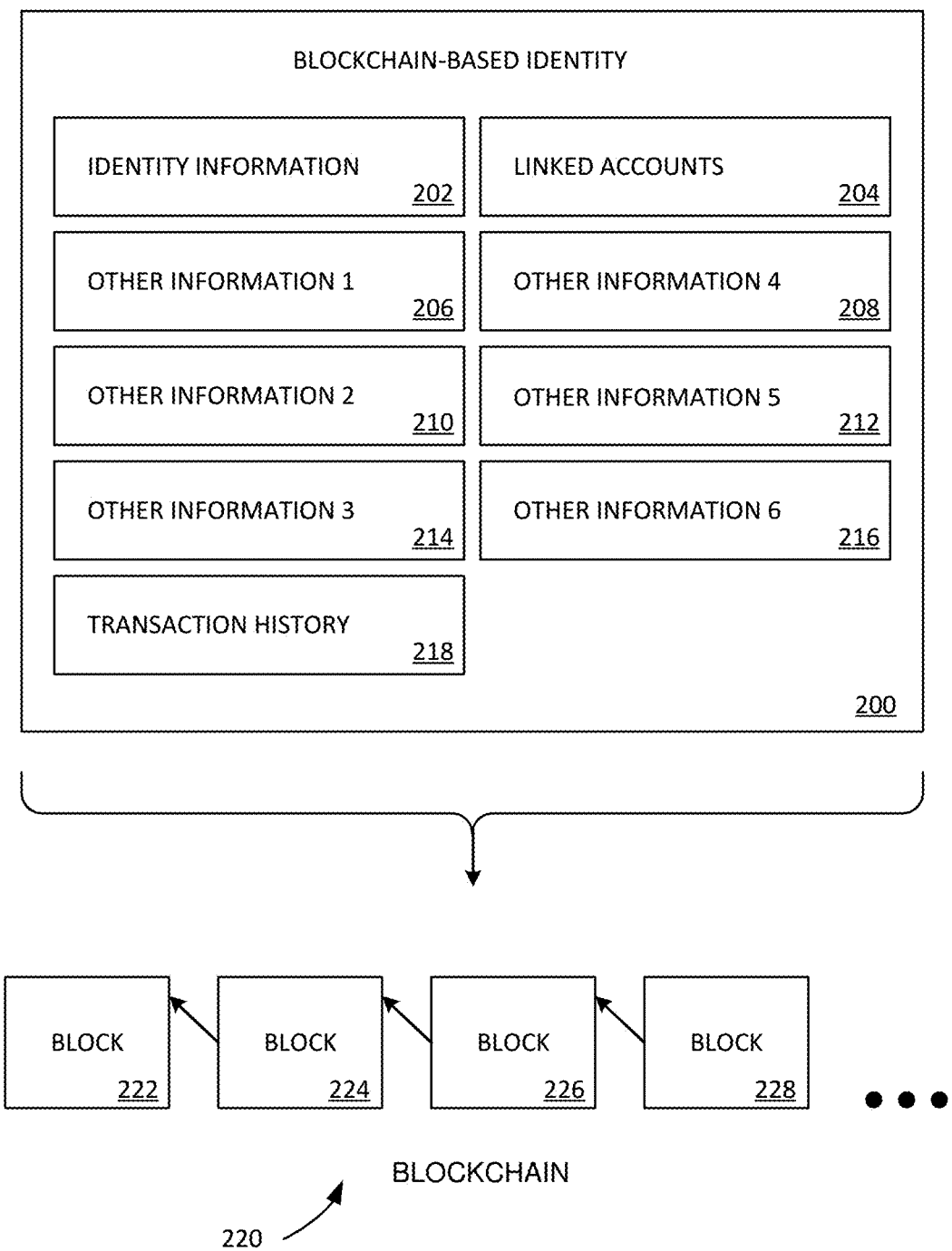
FIG. 2 illustrates an example blockchain-based identity.

Identity information, transaction information, and other information for a user that is stored in blockchain 122 can form a blockchain-based identity of the user. FIG. 2 illustrates an example blockchain-based identity 200. Blockchain-based identity 200 includes various information 202, 204, 206, 208, 210, 212, 214, 216, and 218. Although blockchain-based identity 200 is shown as including each of the preceding particular categories of information, example blockchain-based identities can also include only some of these categories of information and/or include additional categories of information. Identity information 202 can include, for example, an image of a user, a name, identifier(s), and/or fingerprint or eye pattern information of the user (or other biometric information of the user). The information can be presented as aggregated information or as individual items.

Blockchain-based identity 200 can also include a score that can be used by institutions who are users in the blockchain-based identity and transaction platform. The score can be determined based on a weighting scheme for different types of information. In some examples, particular institutions are able to select particular criteria of interest and/or desired weightings for different criteria, and a custom score is determined based on those criteria. Various approaches to quantifying a particular category can be used (e.g., percentile rank of criteria, scale of 1-10, etc.).

Blockchain-based identity 200 is stored in blockchain 220. Blocks 222, 224, 226, and 228 of blockchain 220 are shown in FIG. 2, but any number of blocks can form blockchain 220. As indicated by the arrows between blocks 222, 224, 226, and 228, the respective blocks are linked to the previous block in the blockchain. This link can be in the form of, for example, a hash of the previous block.

Figure 3:
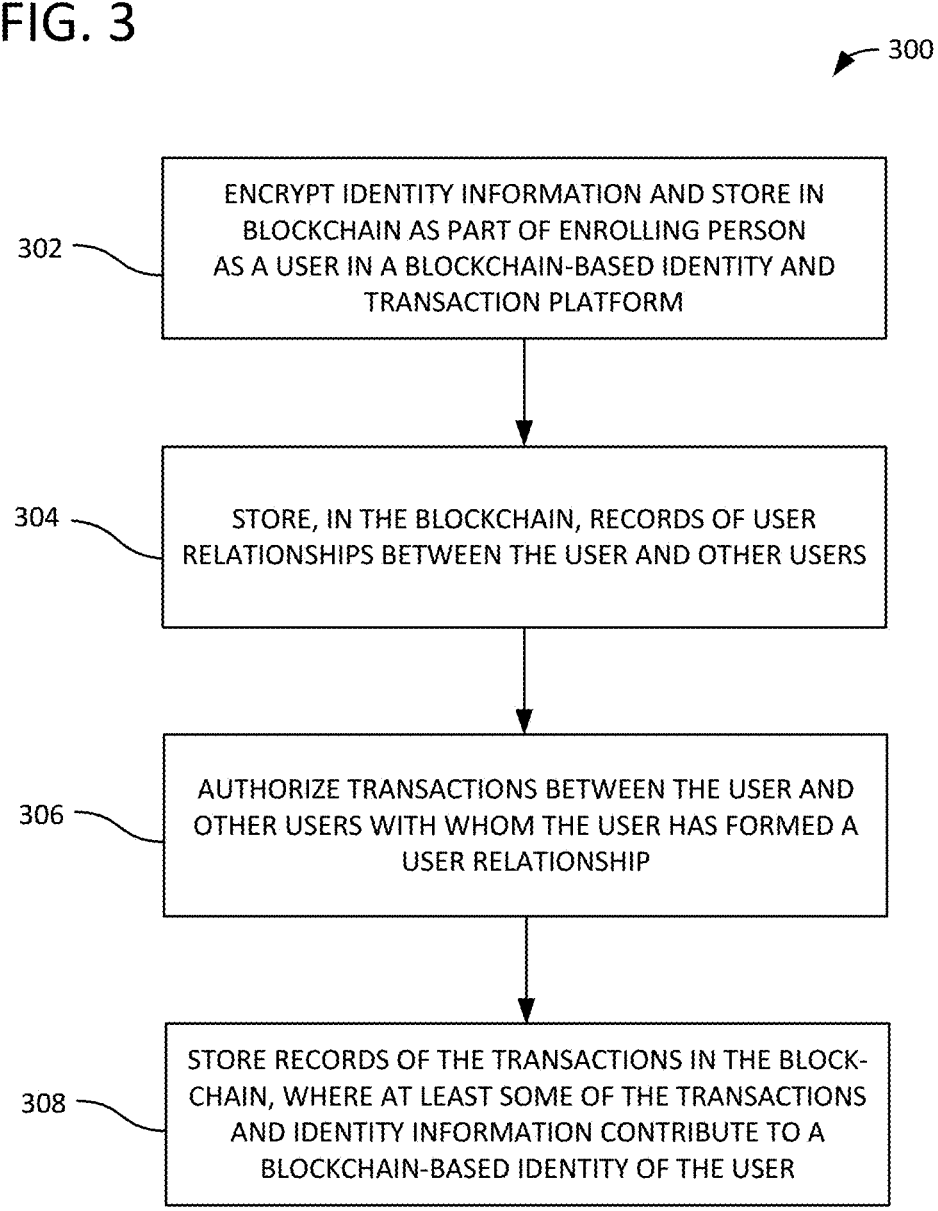
FIG. 3 is a diagram illustrating an example method of authorizing transactions in a blockchain-based identity and transaction platform.

FIG. 3 illustrates a method 300 of authorizing transactions in a blockchain-based identity and transaction platform. In process block 302, identity information for a person is encrypted, and the encrypted identity information is stored in a blockchain as part of enrolling the user in the blockchain-based identity and transaction platform. The identity information can include, for example, an image of the person. The identity information can alternatively or additionally include at least one of a name, identifier(s), fingerprint, or eye pattern information.

In process block 304, records of user relationships between the user and other users are stored in the blockchain. For users of the blockchain-based identity and transaction platform, a user relationship can be formed, e.g., by performing a search or lookup of registered users and sending a user identified through the search or lookup a message indicating that a user relationship is desired. If the other user accepts the request, then a user relationship is established. In some situations, however, a user may wish to perform a transaction with a person who is not a user of the blockchain-based identity and transaction platform. In such situations, a user may send an invitation to connect to the person's email address, messaging account, or other contact point, with the message including a link or instructions for creating an account with the platform and indicating that the user would like to establish a user relationship.

Transactions between the user and one or more of the other users with whom the user has formed a user relationship are authorized in process block 306. The transactions are stored in the blockchain. Records of the transactions are stored in the blockchain in process block 308. At least some of the transactions and identity information contribute to the blockchain-based identity of the person. Additional information that can be part of the blockchain-based identity is illustrated, e.g., in FIG. 2.

In process block 306, the identity information of a user can be used in the authorization. For example, when the identity information includes an image of the person, this image can be used in authorizing the transactions. Process block 306 can include a multi-stage verification approach as discussed, for example, with respect to FIGS. 5 and 6. In some examples, method 300 further comprises providing the blockchain-based identity of the user to a requesting party, where the requesting party is a user in the blockchain-based identity and transaction platform. As an example, a user may wish to perform a transaction, and prior to initiating or authorizing the transaction, the requesting party can request the user's blockchain-based identity (e.g., through a client-side software application) in order to evaluate the user.

In some examples, institutions that establish accounts with the blockchain-based identity and transaction platform can access (e.g., through a web application or client-side software) a user interface to allow the institution to view blockchain-based identities for other users who give permission. In some examples, users can control which categories of information are included in their blockchain-based identity and/or can authorize read access of only certain categories in response to a request.

Figure 4:
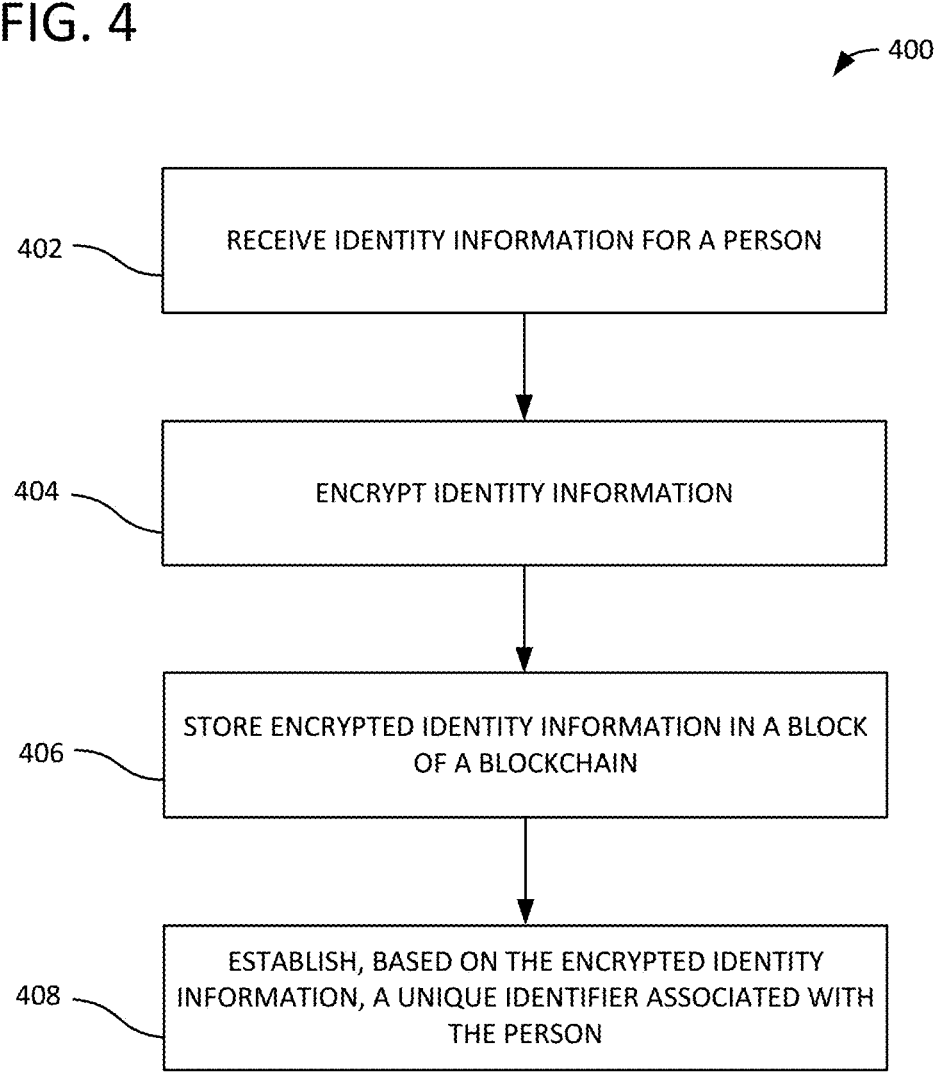
FIG. 4 is a diagram illustrating an example method of enrolling a person as a user in a blockchain-based identity and transaction platform.

FIG. 4 illustrates a method 400 of enrolling a person as a user in a blockchain-based identity and transaction platform. In process block 402, identity information for a person is received. Identity information can include an image of the person (e.g., a selfie) and/or a name, identifier(s), fingerprint, or eye pattern information. In process block 404, the identity information is encrypted. Various encryption techniques can be used. In process block 406, the encrypted identity information is stored in a block of a blockchain. In some examples, a single encryption key can be used and can be stored as, for example, an environmental variable on a computer storage device associated with the blockchain-based identity and transaction platform.

In some examples, an encryption service, such as encryption service 120 of FIG. 1, can be used. The encryption service can create and manage encryption keys. In such an example, software implementing aspects of the blockchain-based identity and transaction platform can make a call to the encryption service to encrypt the identity information received in process block 402. The service creates the keys, retains a private key, and provides both a public key and the encrypted identity information to the software that made the call to the service. The encryption service can be a web service.

In process block 408, a unique identifier associated with the person is established based on the encrypted identity information. In some examples, process block 408 includes designating the encrypted identity information as the unique identifier. Other unique identifiers can also be used. In some examples, various actions may be taken to validate or authenticate a user's identity prior to establishing the unique identifier. As an example, various third-party sources of information can be used to verify the user's identity.

Method 400 can also further comprise associating, with the unique identifier, other information (e.g., linked accounts, transaction history, etc.) corresponding to the person and storing the other information in the blockchain. Some or all of the associated information can be used to form the blockchain-based identity of the person, as discussed, for example, above with respect to FIG. 2. Transaction information representing one or more transactions between the person and one or more additional parties, as well as user relationships between the person and additional parties, can also be stored in the blockchain in association with the unique identifier or other information indicating the user (such as the public key, even if the public key is not used as the unique identifier).

Figure 5:
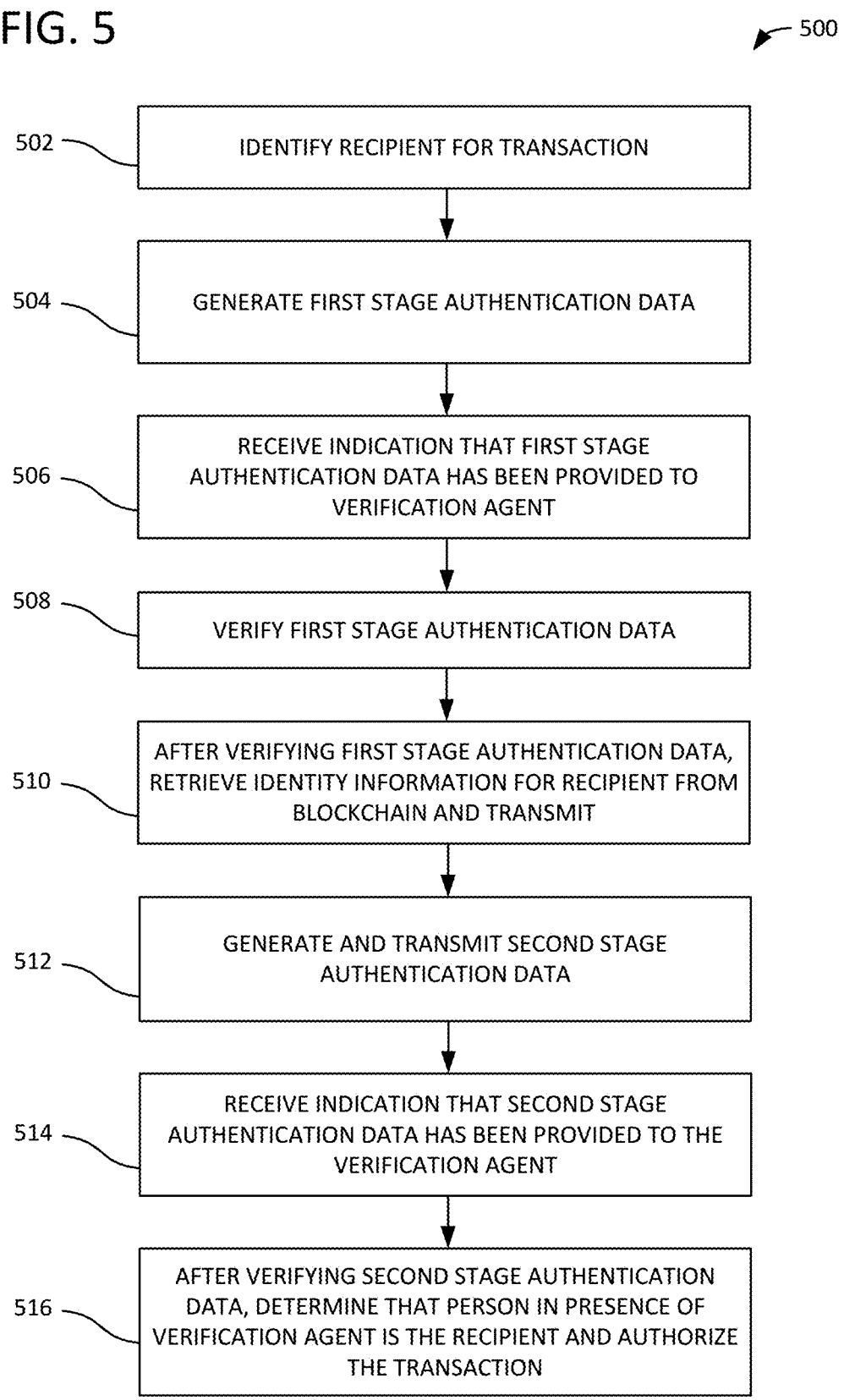
FIG. 5 is a diagram illustrating an example method of authorizing transactions in a blockchain-based identity and transaction platform using a multi-stage verification process.

FIG. 5 illustrates a method 500 of verifying a transaction in a blockchain-based identity and transaction platform. In process block 502, a recipient for a transaction is identified. In some examples, a recipient can be any person, and in some examples, the recipient is limited to a user of the blockchain-based identity and transaction platform. In some examples in which the recipient is not a user of the platform, the person can be sent a link or instructions for enrolling as a user in the platform after the transaction is initiated, and the transaction does not proceed until the person enrolls and establishes a user relationship with the sender. In such examples, the recipient is a prospective recipient until the person enrolls and establishes the user relationship.

First stage authentication data is generated in process block 504. First stage authentication data can be, for example, a code including numbers and/or letters. The first stage authentication data can be provided to the recipient. For example, the recipient can receive a text message, email message, or application alert including: a statement that something is available to be claimed; a code (e.g., a 9-digit numeric, alphanumeric, or letter code); and instructions to complete the verification process in order to claim the thing. In some examples, the first stage authentication data is only valid for a certain amount of time (one hour, one day, one week, etc.). In some examples, the first stage authentication data is valid long enough to allow for the recipient to claim the thing according to the recipient's schedule.

In process block 506, an indication is received that the first stage authentication data has been provided to a verification agent. A verification agent is a user in the blockchain-based identity and transaction platform who serves in a third-party role. The verification agent can communicate with the platform through, for example, verification agent computing device 126 of FIG. 1. As an example, the verification agent can be a member of an entity that is an assistance provider, and when a user receives (e.g., via a text on the user's mobile phone) a message and code indicating that a packet is available, the user takes the code to the verification agent, who can be located at a kiosk, building, or other facility. The verification agent then enters the code through a software application user interface. "Verification agent" as used herein may also refer to a verification agent computing device. In some examples, the person can enter a code into an automated terminal.

In process block 508, the first stage authentication data is verified. For example, the code provided in the initial message can be compared against the code entered by the agent (or in some examples, entered by the person). Verification of the first stage authentication data provides some confirmation that the person who provided the code to the agent is the actual recipient.

In process block 510, identity information for the recipient is retrieved from one or more blocks in a blockchain after verifying the first stage authentication data and is transmitted (e.g., to the verification agent). The identity information can be used to further confirm that the person is the actual recipient. Continuing the example above, after the verification agent has entered the code provided by the person, and the code has been verified (e.g., by a remote server computer) as a match to the code provided in the original message, an image of the recipient can be provided to the agent. The image can be the image used to create the recipient's profile (and the image that is encrypted and stored in the blockchain). If the image appears to be the same person as the person in the presence of the agent who provided the code, then the agent confirms an identity match.

In some examples, facial recognition software is used to determine whether there is a match between the person and the image. In some examples, fingerprint or eye pattern matching can be performed instead of comparing the appearance of the person to an image. In examples in which an automated terminal is used, instructions can be presented for the person to place their finger, eye, or face on a scanner or in front of a camera, and comparison of the identity information can be performed by software.

In some examples, rather than affirmatively confirming an identity match, the agent can refuse to complete any further actions (e.g., entering a second code) if the person in the agent's presence does not appear to match the image (or other biometric information).

Identity information, such as an image, is stored in an encrypted form in the blockchain. In examples in which an encryption service is used, software associated with the platform can make a call to the encryption service and request a temporary token to decrypt the image. The token can be valid for a limited time, and by providing the token back to the encryption service, the decrypted image (or fingerprint, eye pattern, etc.) is provided to the software (or to the verification agent computing device). The software then provides or otherwise makes available the decrypted image to the verification agent.

Second stage authentication data (e.g., a second code such as a 6-digit code) is generated and transmitted in process block 512. In some examples, the second stage authentication data is transmitted at substantially the same time as the identity information is transmitted. In some examples, the second stage authentication data is transmitted after a match is confirmed between biometric information and the person in the presence of the verification agent. The blockchain-based identity and transaction platform account of the recipient can include an associated phone number or other information identifying a mobile device such as a smart phone, feature phone, or tablet. In some examples, the second stage authentication data is sent to the mobile device associated with the recipient, and if the person in the presence of the verification agent is in possession of the associated mobile device, then the person can provide the second code to the verification agent. In some examples, the second stage authentication data is sent in a similar manner to the first stage authentication data (e.g., via email message, application alert, or text message).

In process block 514, an indication is received that the second stage authentication data has been provided to the verification agent. The second stage authentication data and the code provided to the verification agent can then be compared to verify that the code provided to the verification agent is correct. After verifying the second stage authentication data, it is determined in process block 516 that the person in the presence of the verification agent is the actual recipient, and the transaction is authorized.

The multi-stage verification provides several layers of security and requires that a person attempting to claim something must have the first stage authentication data (e.g., first code) associated with the thing as well as the second stage authentication data (e.g., second code) sent after verification of the first code. Further, in some examples, the agent explicitly confirms that the person has a physical appearance or other characteristic corresponding to the actual recipient or implicitly confirms an identity match by entering the second code. Further security can be implemented by requiring that the person in the agent's presence be in physical possession of the intended recipient's mobile device. In some examples, one or more of these security layers may be omitted. Additional layers of security beyond those discussed with respect to FIG. 5 are also possible.

In some examples, process block 510 is omitted (and an image or biometric data of the intended recipient is not transmitted), and after the first stage authentication data is verified, second stage authentication data is generated and transmitted to the recipient's account and/or mobile device.

Method 500 can also include storing a record of the transaction (e.g., including particular transaction components, location data, technical device/network details, etc.) in the blockchain in association with the recipient and/or sender. In some examples, only authorized and completed transactions are stored. The information stored can include the recipient, the sender, and characteristics of the transaction. The first and second stage authentication data can be associated with both the recipient and the transaction.

Figure 6:
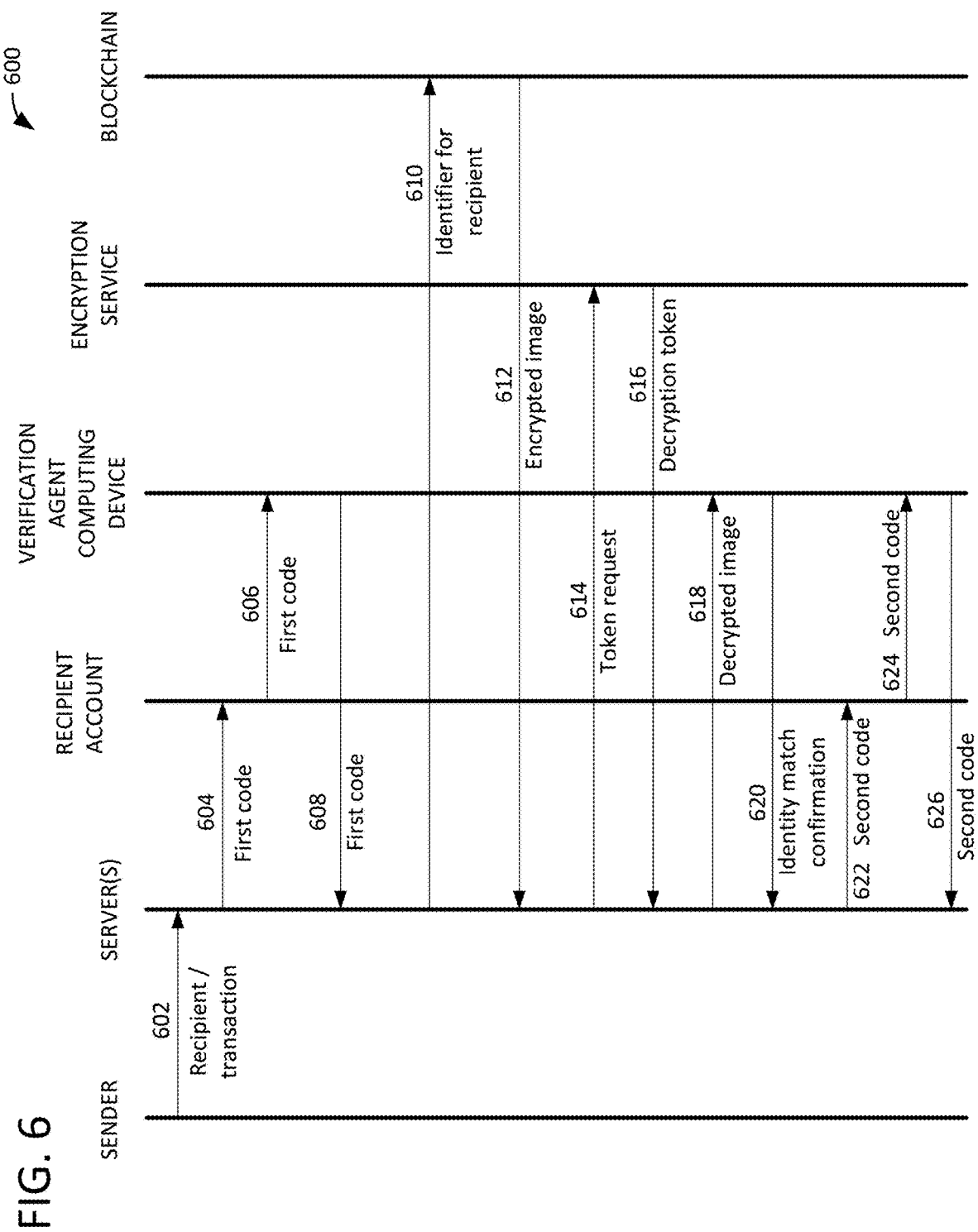
FIG. 6 illustrates interactions in an example transaction authorization.

FIG. 6 is an interaction diagram 600 illustrating a transaction verification process such as that described with respect to FIG. 5. FIG. 6 is discussed with reference to a specific example in which the transaction is a transfer, the first stage authentication data is a first code, the identity information is an image, and the second stage authentication data is a second code. A similar set of interactions applies to other scenarios.

A sender initiates a transfer to a recipient who has an account with the blockchain-based identity and transaction platform. The recipient has a user relationship with the sender. In interaction 602, the details of the initiated transaction, including the recipient, type of transaction, and amount to transfer are submitted by the sender to server(s) implementing aspects of the blockchain-based identity and transaction platform, such as server computer(s) 106 of FIG. 1. In interaction 604, first stage authentication data (a first code) is sent to the recipient's account. The first code can be sent, for example, as a text message or email. The first code can also be sent as an account alert that appears in a web interface (or in client-side software running on a computing device or mobile device). The message can also provide instructions to the recipient for completing the transaction.

The recipient then provides the first code to a verification agent in interaction 606. In some examples, the code can be shown to a person serving as an agent, who then enters the code into a verification agent computing device. In other examples, the recipient can enter the code into an automated terminal or kiosk. In still other examples, the verification agent computing device can be remote, and the recipient either forwards the message to the verification agent or enters the code via a web interface.

The verification agent enters and sends the code provided by the recipient back to the server(s) in interaction 608. The server(s) verify that the code matches the first code sent in interaction 604. In some examples, if there is not a match, the transaction is cancelled. In other examples, a limited number of code entry attempts are permitted before the transaction is cancelled.

After determining that the first code matches, identity information (e.g. an image of the intended recipient) is used to further confirm that the person who provided the first code is the intended recipient. In interaction 610, the server(s) send the recipient's unique identifier (e.g., the public key corresponding to the recipient's encrypted image or other identity information) to the blockchain to retrieve the recipient's encrypted image. In transaction 612, the encrypted image is provided to the server(s). In examples in which encryption is handled by the server(s), the image is then decrypted. In examples in which an encryption service is used, such as FIG. 6, the server(s) interact with the encryption service to decrypt the image. In FIG. 6, this is done through use of a decryption token. The server(s) send a token request to the encryption service in interaction 614, and a decryption token is provided back to the server(s) in interaction 616. The decryption token allows the server(s) to decrypt the image and provide the decrypted image to the verification agent in interaction 618. In some examples, the decrypted image can be sent directly from the encryption service to the verification agent. In certain instances when other forms of biometrics (such as fingerprints, iris patterns, or facial recognition) are used, the decryption steps can include matching a physically presented fingerprint, iris, or face to stored biometric data (e.g., biometric data encrypted and stored on the blockchain).

In examples in which the verification agent is a person interacting with a verification agent computing device, the decrypted image of the intended recipient can be presented on the verification agent computing device, and the agent can make a judgment as to whether the person in the agent's presence appears to be the same as the person pictured in the image. In examples in which the verification agent is an automated terminal, the person can present their face to allow the terminal to create an image and then compare that image to the decrypted image of the intended recipient using facial recognition or other image recognition software. In examples in which the verification agent is remote (whether a remote person or a remote computing device), the person can be instructed to take a selfie and send the selfie to a verification agent/upload the selfie. The selfie and the decrypted image can then be compared either by the remote person or by software executing on the remote computing device. In interaction 620, an identity match confirmation is provided back to the server(s) by the verification agent computing device indicating that the person appears to be the intended recipient.

At this point, both the first code and an image of the intended recipient have been used to verify that the person attempting to claim the thing is the intended recipient. It is possible that a person who is not the intended recipient could have intercepted the first code (e.g., by accessing the initial message while using the intended recipient's phone), and it is further possible that the person intercepting the first code resembles the intended recipient sufficiently to convince a verification agent (or facial recognition software). Although such situations would likely be rare, an additional layer of security can also be used-sending a second code to the recipient.

In interaction 622, the server(s) send second stage authentication data (e.g., a second code), which can be time-limited, to the recipient's account (e.g., via text message, email message, or application alert). The recipient then provides the second code back to the verification agent in interaction 624. The verification agent sends the provided second code back to the server(s) in interaction 626, and if the code matches the second code sent to the recipient's account in interaction 622, then the transaction is authorized. In examples in which the second code is time-limited, the transaction is only authorized if executed within predetermined time constraints. The transfer can then be completed or authorized. The completed transaction is then stored in the blockchain in association with the recipient and/or the sender.

In some examples, interaction 620, in which the identity match confirmation is provided back to the server(s), is not performed affirmatively, but a match is implicitly confirmed when the verification agent enters the second code in interaction 626. In such examples, after the verification agent has provided the first code to the server(s) in interaction 608, and the first code has been verified by the server(s) (and after the retrieval/decryption interactions 610, 612, 614, and 616, if performed) the second code is sent to the recipient account in interaction 622 at substantially the same time as the decrypted image is sent to the verification agent in interaction 618. When the person in the verification agent's presence provides the second code to the agent in interaction 624, the agent can refuse to enter the second code (or cancel the transaction) if the person in the agent's presence does not appear to match the decrypted image. Such an example is illustrated in FIG. 7.

In various examples, the verification agent can be implemented on the server(s) or eliminated. For example: the first code provided in interaction 604 can be provided directly back to the server(s); the decrypted image can be retained at the server(s) and not be sent to the verification agent and instead a person can provide a selfie which is compared to the decrypted image at the server(s); and the second code received at the recipient's mobile device can be provided directly back to the server(s) (e.g., by entering/uploading the code through an interface on the mobile device).

Figure 7:
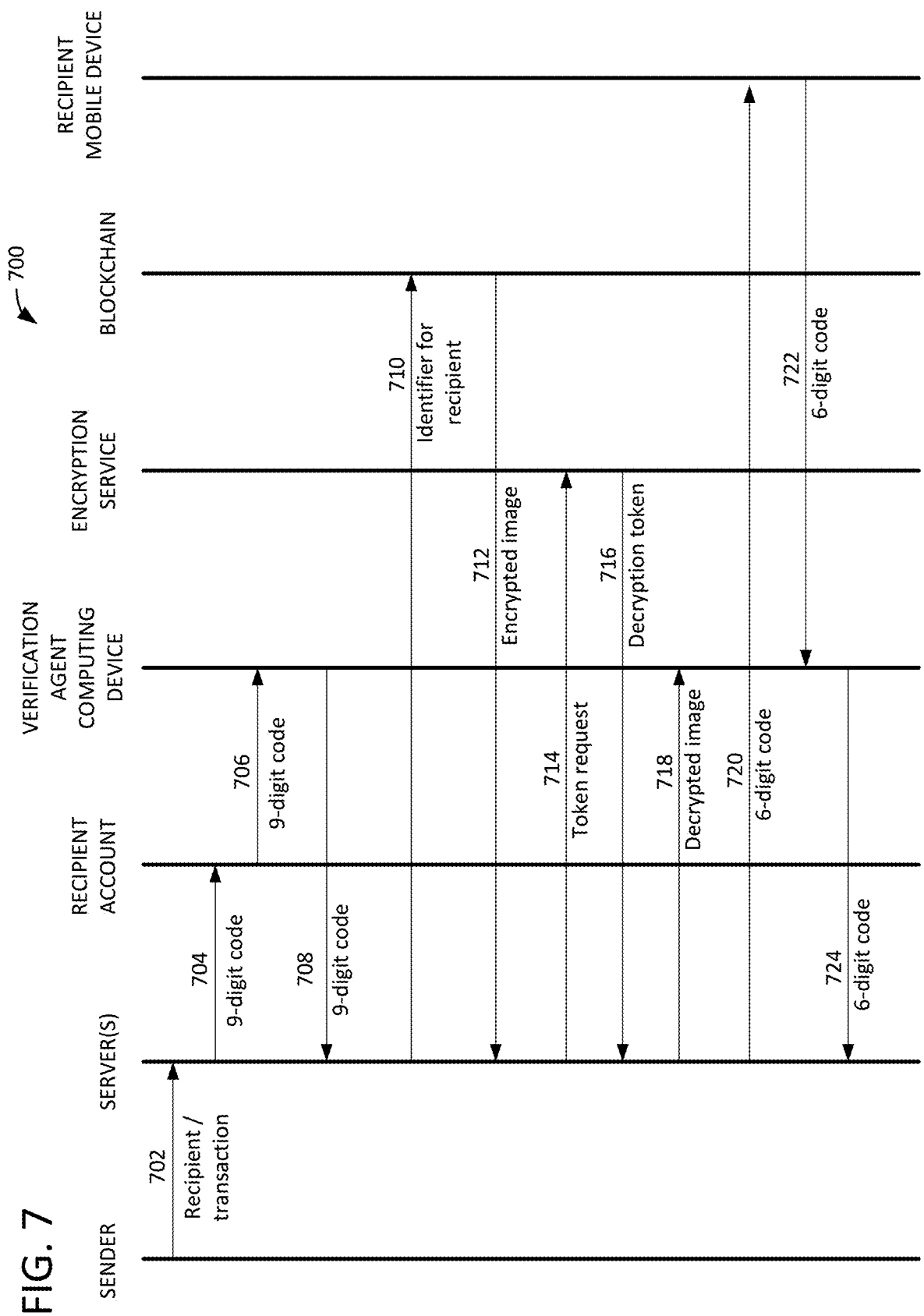
FIG. 7 illustrates interactions in an example transaction authorization in which a second code is sent to a user's mobile device.

FIG. 7 is an interaction diagram 700 illustrating a transaction verification process such as that described with respect to FIGS. 5 and 6. In FIG. 7, the transaction is a transfer, the first stage authentication data is a 9-digit code, the identity information is an image, and the second stage authentication data is a 6-digit code. As with FIG. 6, a similar set of interactions can apply to other scenarios.

A sender initiates a transfer to a recipient who has an account with the blockchain-based identity and transaction platform. The recipient has a user relationship with the sender. In interaction 702, the details of the initiated transaction, including the recipient, type of transaction, and amount to transfer are submitted by the sender to server(s) implementing aspects of the blockchain-based identity and transaction platform, such as server computer(s) 106 of FIG. 1. In interaction 704, first stage authentication data (a 9-digit code) is sent to the recipient's account. The 9-digit code can be sent, for example, as a text message or email. The code can also be sent as an account alert that appears in a web interface (or client-side software running on a computing device or mobile device). The message can also provide instructions to the recipient for completing the transaction.

The recipient then provides the 9-digit code to a verification agent in interaction 706. In some examples, the code can be shown to a person serving as an agent, who then enters the code into a verification agent computing device. In other examples, the recipient can enter the code into an automated terminal or kiosk. In still other examples, the verification agent computing device can be remote, and the recipient either forwards the message to the verification agent or enters the code via a web interface.

The verification agent enters and sends the 9-digit code provided by the recipient back to the server(s) in interaction 708. The server(s) verify that the code matches the code sent in interaction 704. In some examples, if the code does not match, the transaction is cancelled. In other examples, a limited number of code entry attempts are permitted before the transaction is cancelled.

After determining that the 9-digit code matches, identity information (e.g. an image of the intended recipient) is used to further confirm that the person who provided the 9-digit code is the intended recipient. In interaction 710, the server (s) send the recipient's unique identifier (e.g., the public key corresponding to the recipient's encrypted image or other identity information) to the blockchain to retrieve the recipient's encrypted image. In transaction 712, the encrypted image is provided to the server(s). In examples in which encryption is handled by the server(s), the image is then decrypted. In examples in which an encryption service is used, such as FIGS. 6 and 7, the server(s) interact with the encryption service to decrypt the image. In FIG. 7, this is done through use of a decryption token. The server(s) send a token request to the encryption service in interaction 714, and a decryption token is provided back to the server(s) in interaction 716. The decryption token allows the server(s) to decrypt the image and provide the decrypted image to the verification agent in interaction 718.

In interaction 720, the server(s) send second stage authentication data (e.g., a 6-digit code), which can be time-limited, to the recipient's mobile device (or in some examples, to the user's account). Interaction 720 can occur substantially at the same time as the decrypted image is transmitted to the verification agent in interaction 718. The recipient then provides the 6-digit code back to the verification agent in interaction 722. If the decrypted image provided to the agent in interaction 718 does not appear to match the person in the agent's presence, the verification agent can refuse to enter the 6-digit code or otherwise cancel the transaction. This serves as an extra layer of security to ensure that the person attempting to claim something is the intended recipient. If the decrypted image does match the person in the agent's presence, then the verification agent sends the provided 6-digit code back to the server(s) in interaction 724, and if the code matches the 6-digit code sent to the recipient's mobile device in interaction 720, then the transaction is authorized.

In examples in which the 6-digit code is time-limited, the transaction is only authorized if executed within predetermined time constraints. The transfer can then be completed or authorized. The completed transaction is then stored in the blockchain in association with the recipient and/or the sender.

Figure 8:
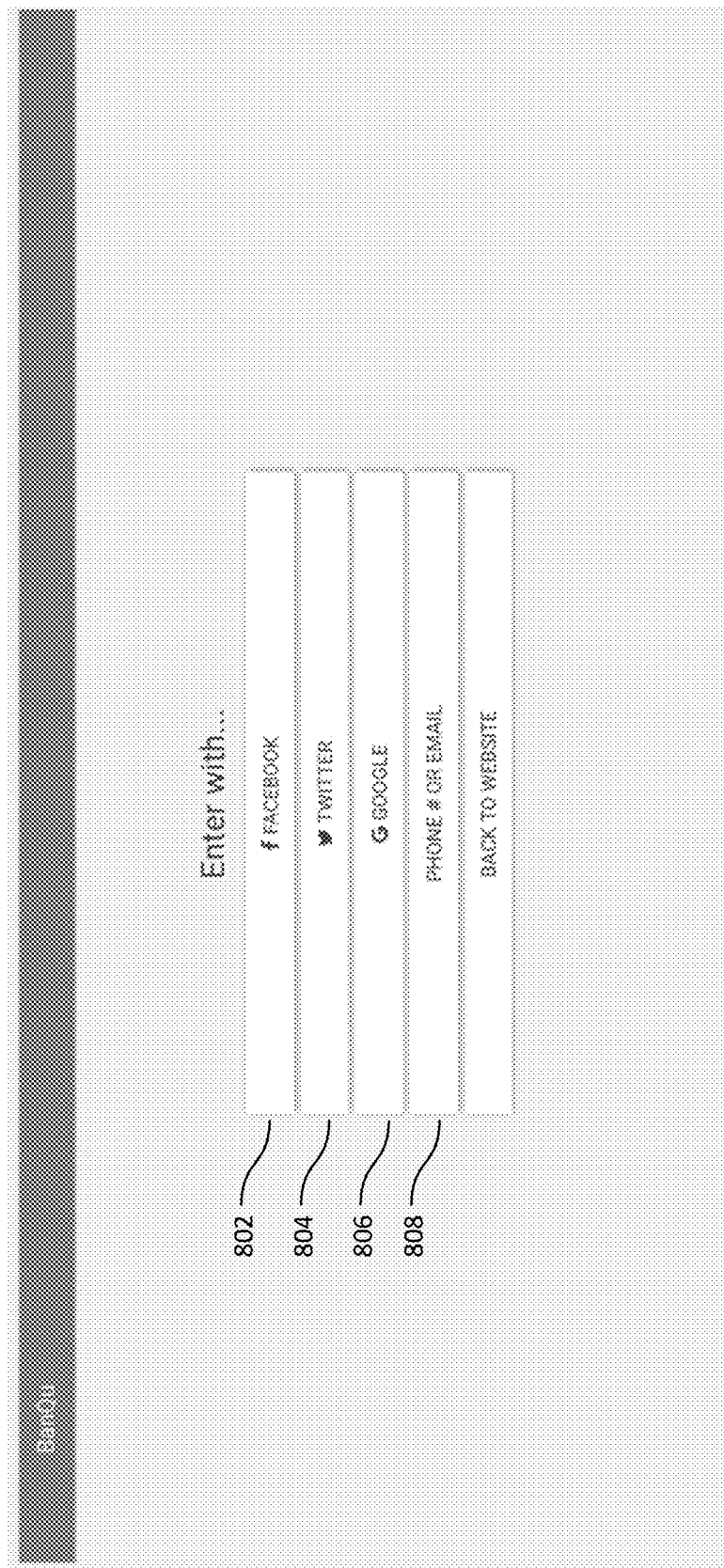
FIGS. 8-23 illustrate example user interfaces for interacting with a blockchain-based identity and transaction platform.

FIG. 8 illustrates a user interface 800 that provides a number of different options to sign in to a blockchain-based identity and transaction platform, including option 802 to sign in using a Facebook account, option 804 to sign in using a Twitter account, option 806 to sign in using a Google account, and option 808 to sign in using a phone number or email address. User interface 800, as well as the user interfaces discussed with reference to FIGS. 9-23, can be presented in a web application or client-side software executing on a client computing device.

Figure 9:
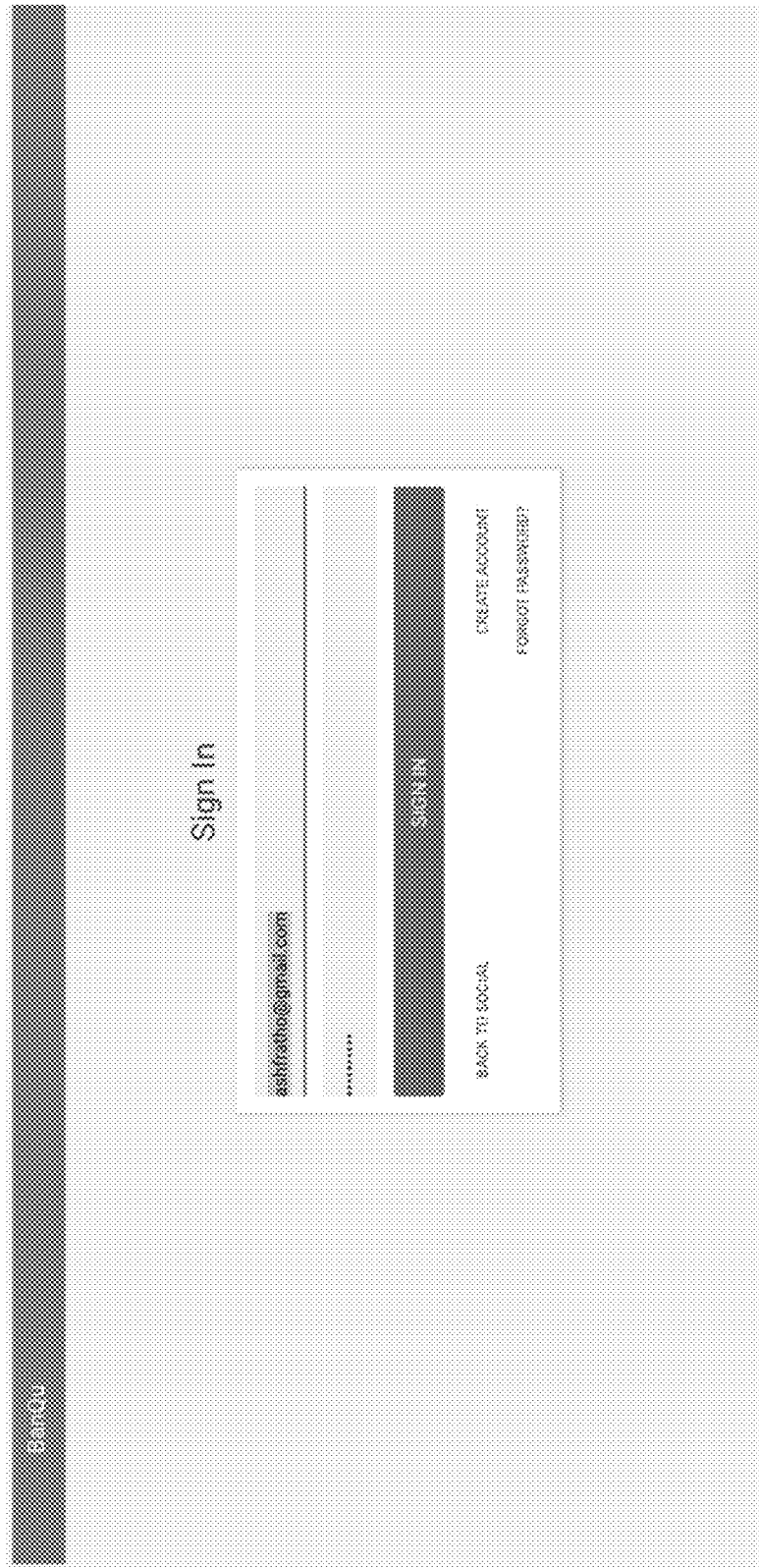
Figure 10:
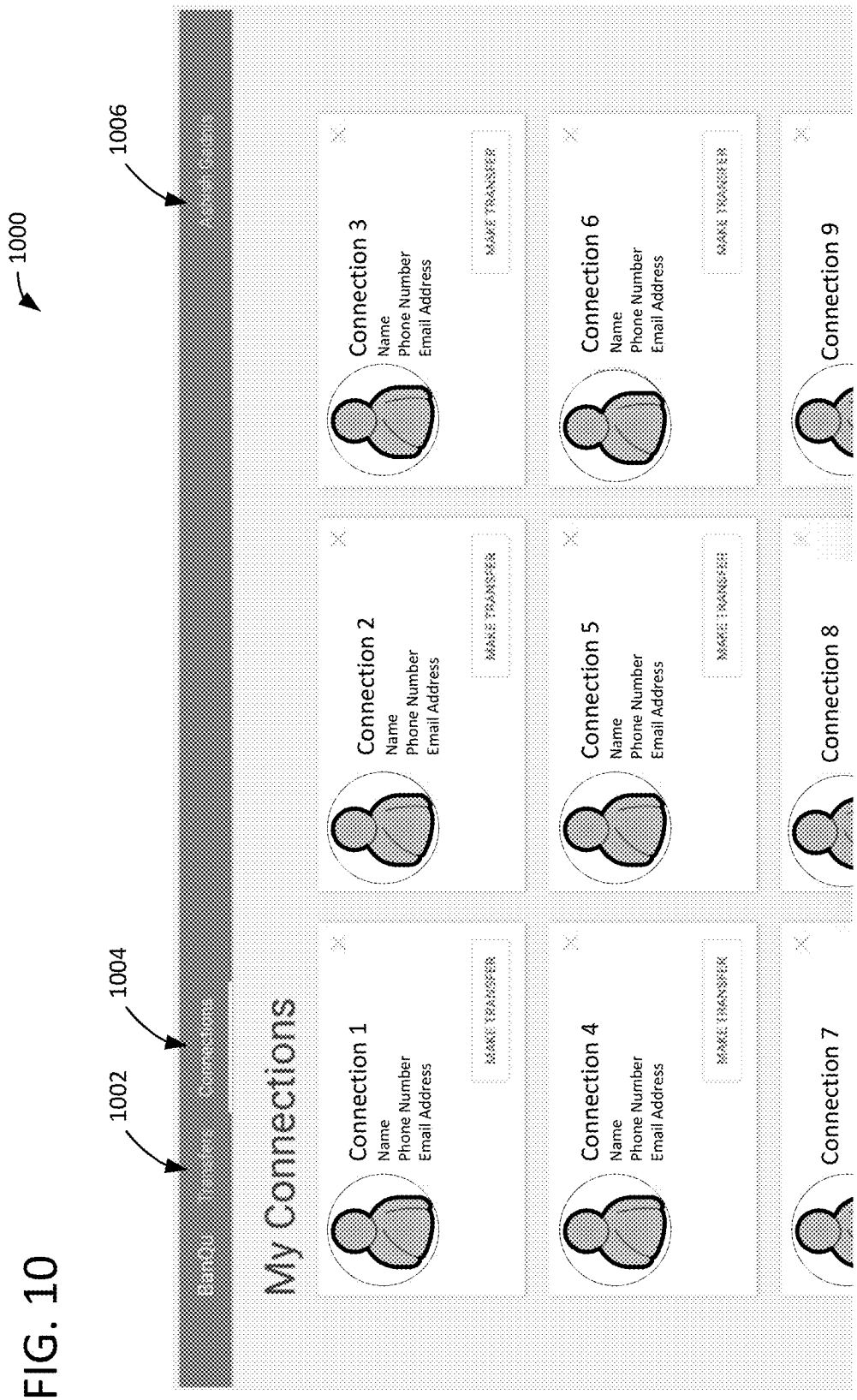

In FIG. 9, user interface 900 displays an email sign in user interface. FIG. 10 illustrates a user interface 1000 in which the user has signed in. User interface 1000 includes a "Transfers" tab 1002, a "Connections" tab 1004, and a user tab 1006 (user "Ashish Gadnis" shown). Transfers tab 1002 can display all or recent transfers to or from the signed-in user made through the blockchain-based identity and transaction platform. Connections tab 1004, the active tab in user interface 1000, shows connections with whom the user has established a user relationship.

Figure 11:
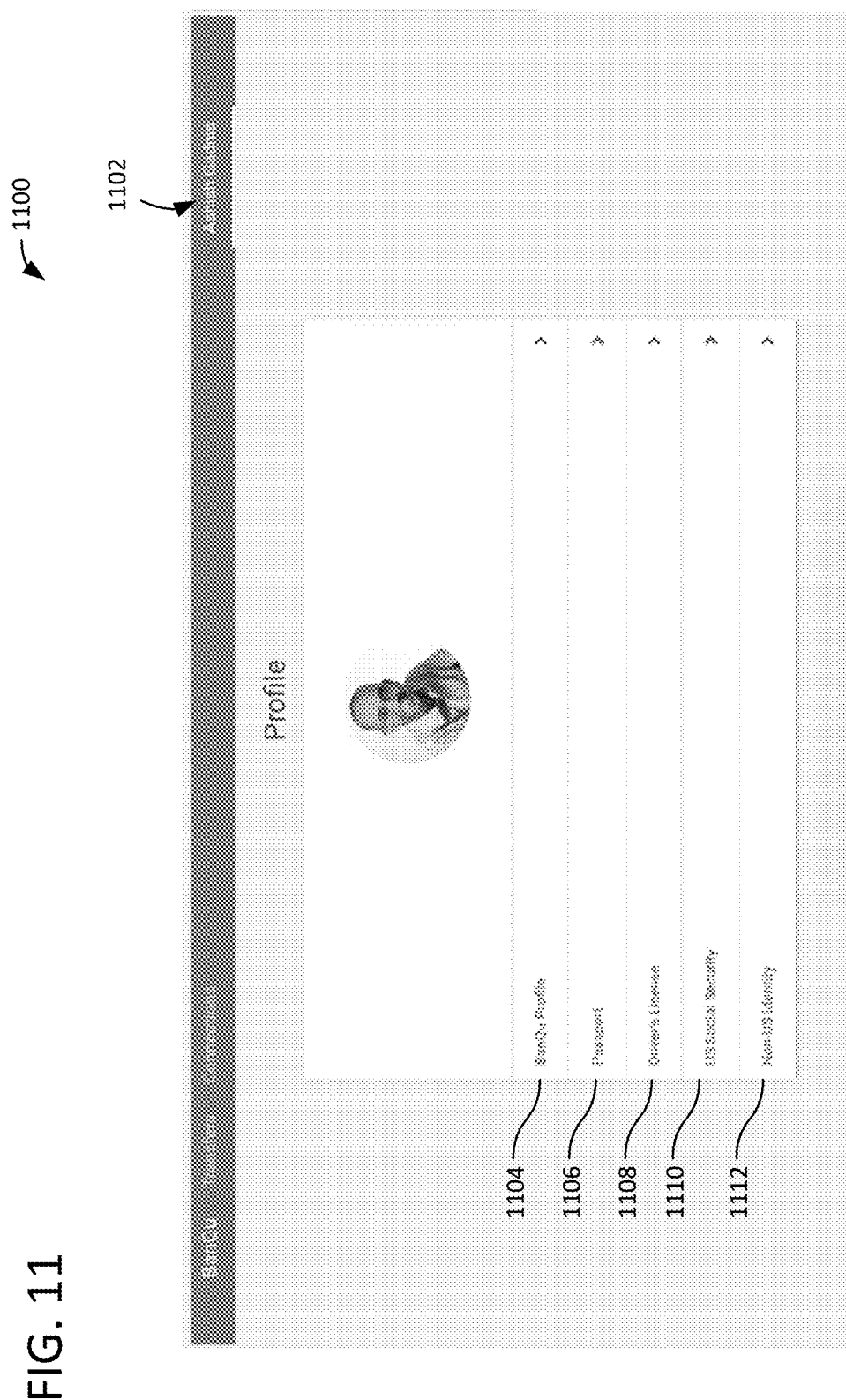

FIG. 11 shows a user interface 1100 in which a user tab 1102, which can be similar to user tab 1006, is active. User interface 1100 displays profile information for the user, including the user's platform profile 1104, which can include login/password information, birth date, text-capable mobile phone number, email address, physical address, or other information. The profile information can also include other information 1106, 1108, 1110, and 1112. Some or all of the profile information can also be part of the user's blockchain-based identity.

Figure 12:
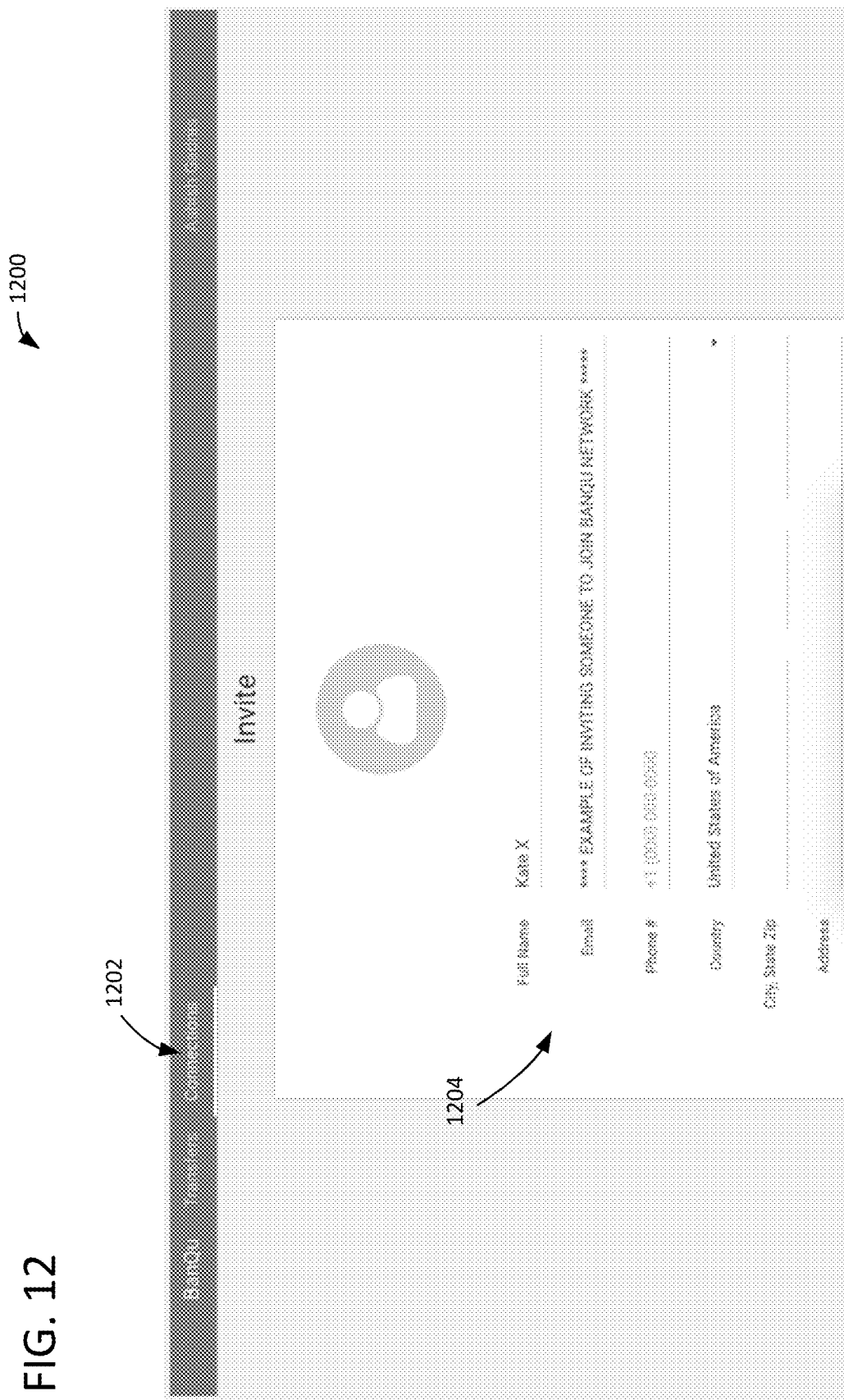

FIG. 12 illustrates a user interface 1200 through which a user can invite another person to either form a user relationship or to establish an account as a user of the platform and form a user relationship. User interface 1200 is presented while a connections tab 1202 is active. Invitation information 1204 can include the invitee's name, email address, text-capable mobile phone number, country, address, and/or other information. Once invitation information 1204 is entered, a message can be sent to the invitee, and the invitee can be prompted to establish an account and/or establish a user relationship with the user.

Figure 13:
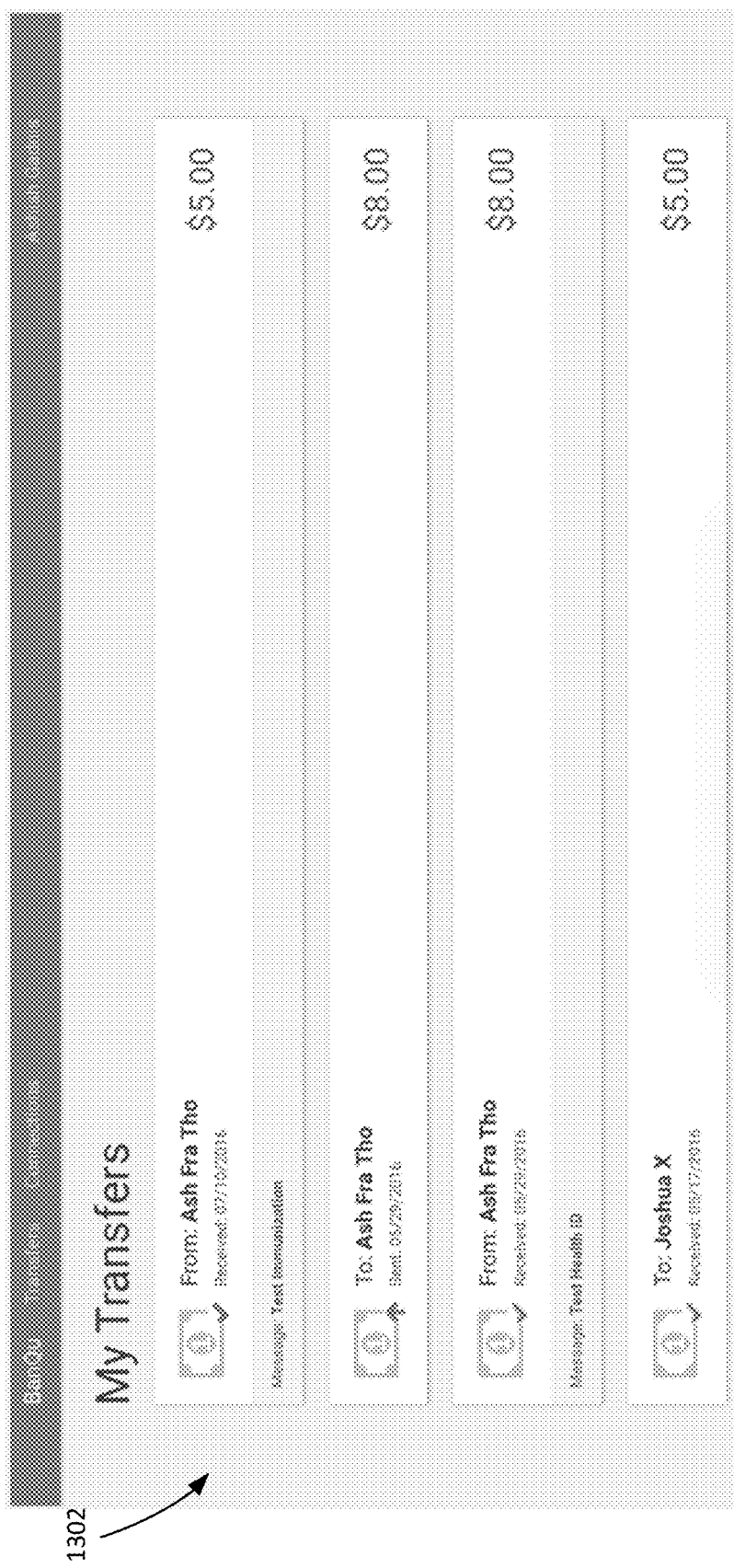
Figure 14:
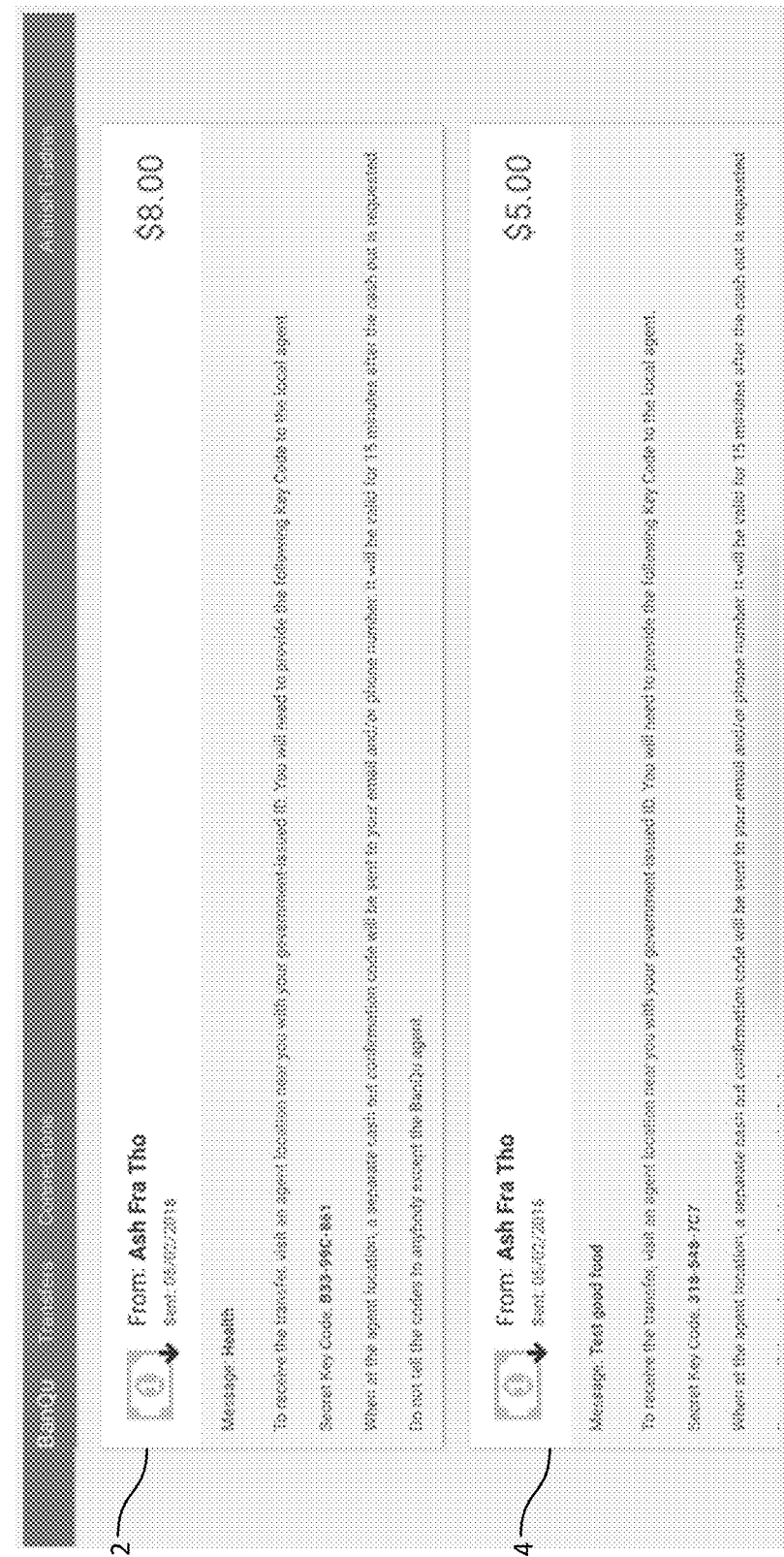

FIG. 13 illustrates a user interface 1300 showing a number of previous transactions 1302 displayed under a "My Transfers" heading. Previous transactions 1302 include transfers both to and from the user. In some examples, the user is able to filter the types of transactions displayed. FIG. 14 shows a user interface 1400 in which a detailed transaction view is displayed. Transaction 1402 includes a message, as well as first authentication data "Secret Key Code: B33-99C-861," and instructions to provide the code to the local agent to receive the transfer. Transaction 1404 includes similarly includes a message, code, and instructions.

Figure 15:
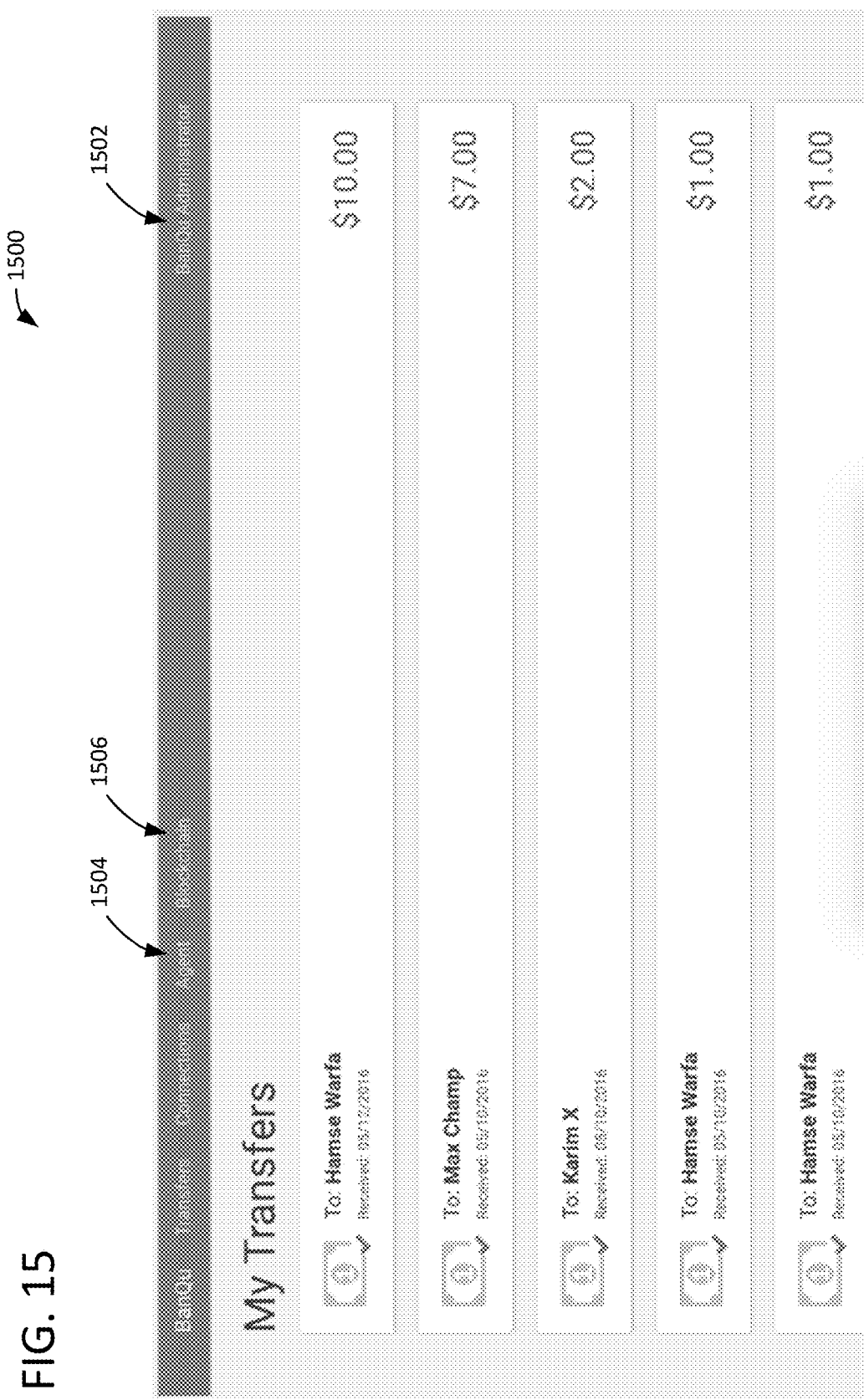
Figure 20:
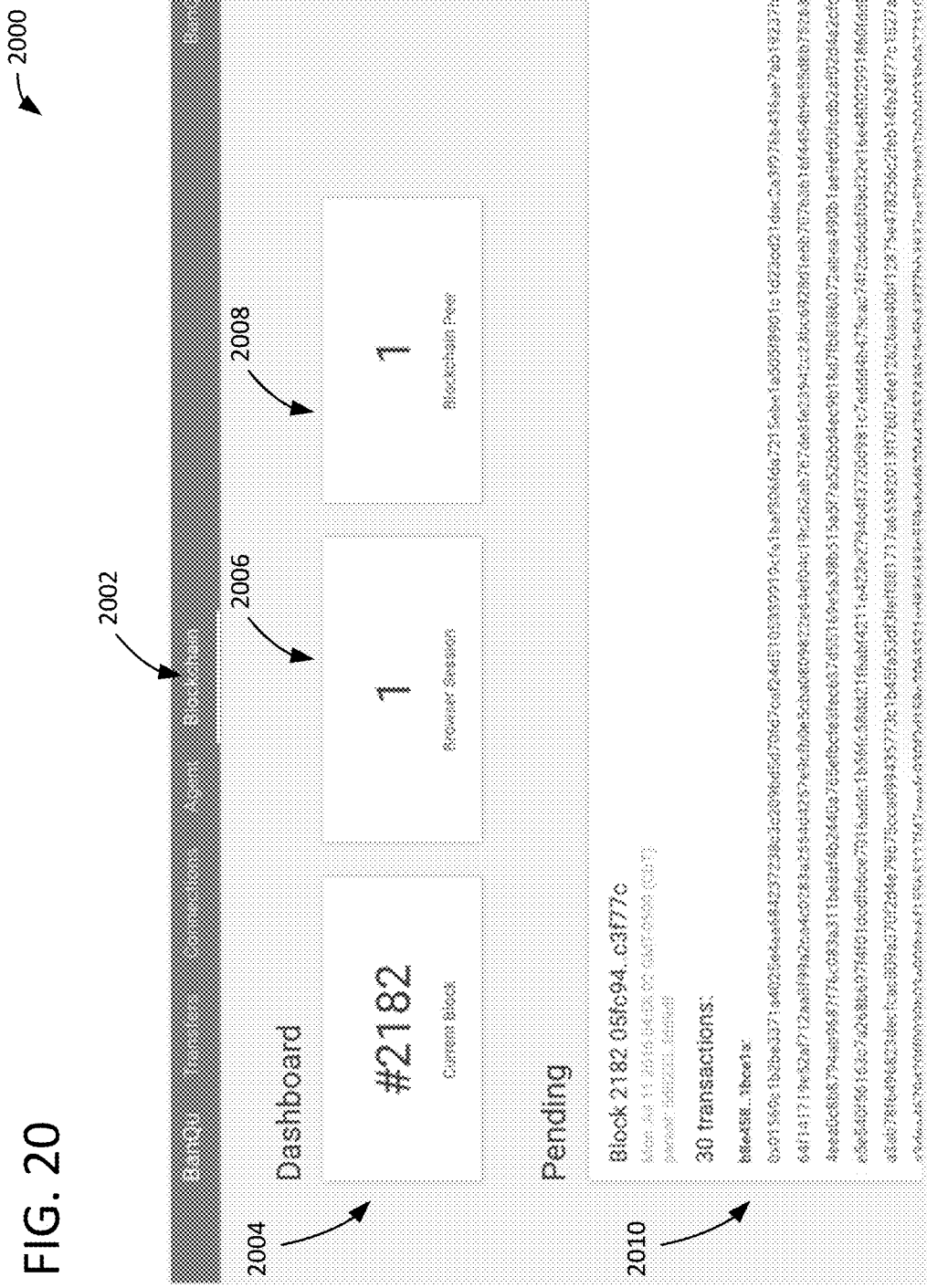

FIG. 15 illustrates a user interface 1500 in which a platform administrator is logged in, as indicated by the "BanQu Administrator" tab 1502. The administrator can view additional information and perform additional actions. For example, "Agent" tab 1504 allows the administrator to act as an agent, and "Blockchain" tab 1506 allows the administrator to access a blockchain view of a transaction, as illustrated in FIG. 20.

Figure 16:
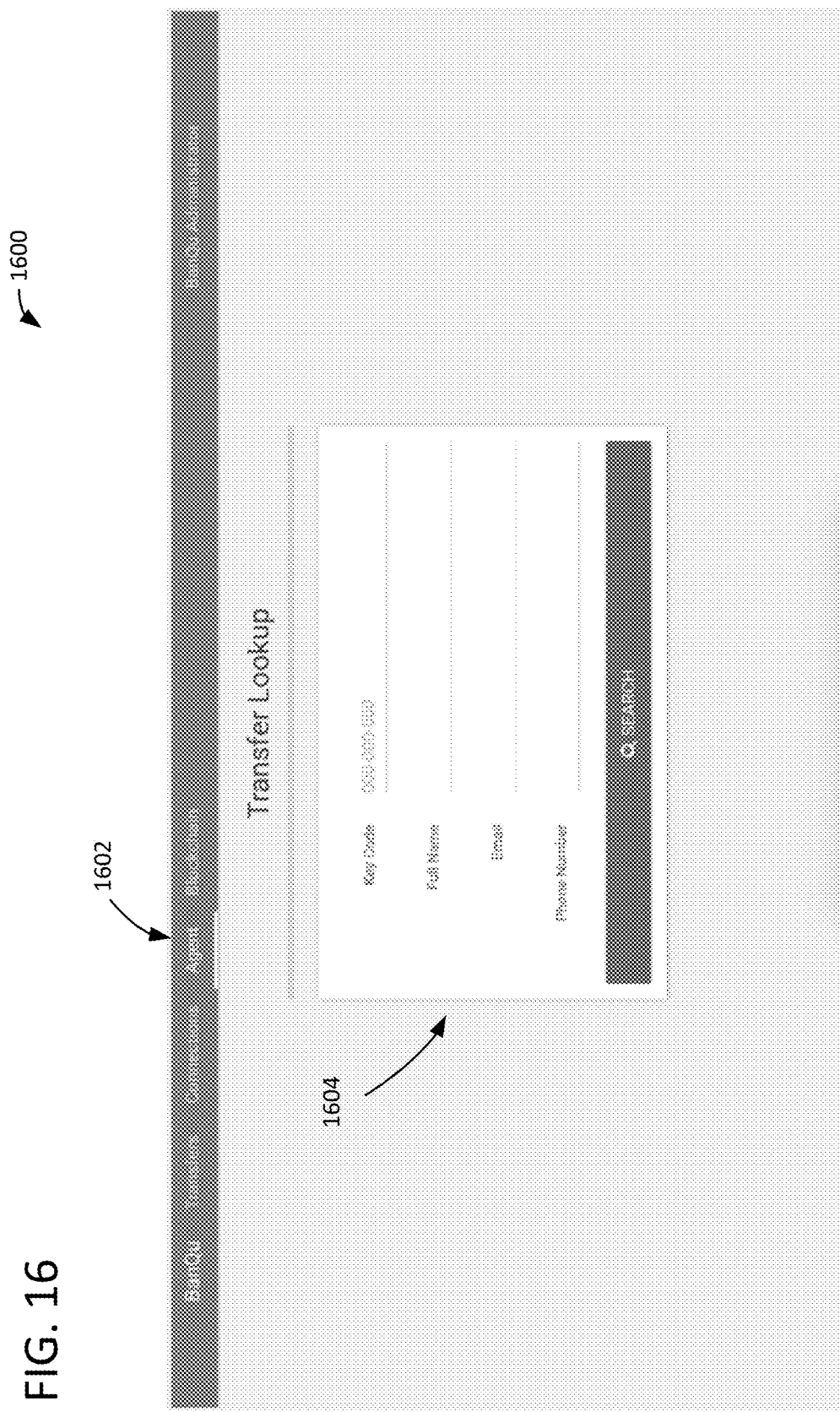

In user interface 1600 of FIG. 16, agent tab 1602 is active, and a transfer lookup interface 1604 is presented. Transfers can be looked up by a key code (e.g., a 9-digit code) and/or additional information such as recipient name, email address, or phone number. User interface 1600 can be, for example, the interface through which an agent enters first authentication data (such as a 9-digit code). In user interface 1700 of FIG. 17, a key code has been entered, and a transfer found interface 1702 is presented that includes identity information 1704 for the recipient (an image) along with the "PhotoETag" 1706, which is a private key, enabled for one-time usage, that verifies the photo and the receiver's identity. In some examples, transfer lookup interface 1604 is what a verification agent can use during a transaction verification process as discussed, for example, with respect to FIGS. 5, 6, and 7.

Figure 17:
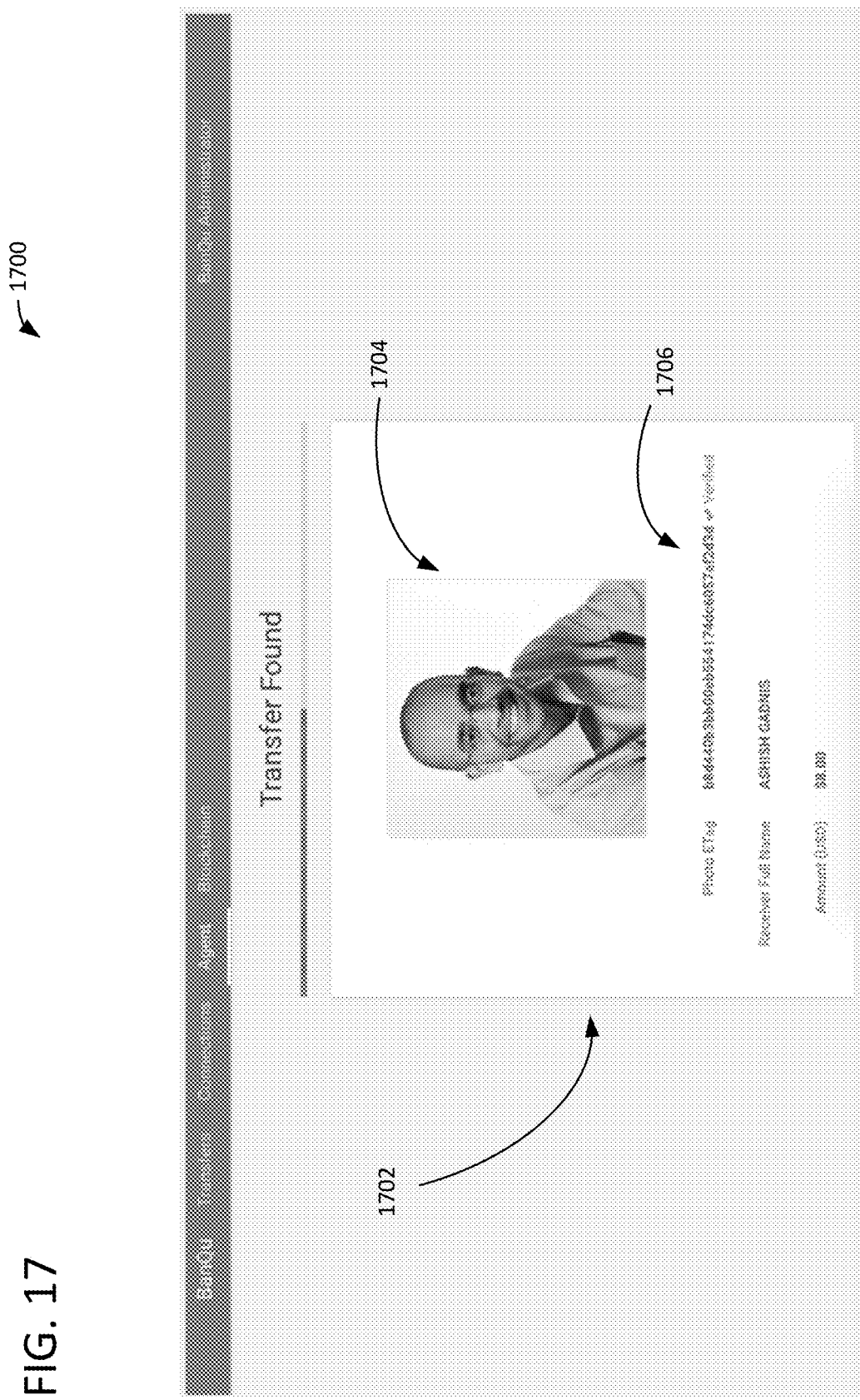
Figure 18:
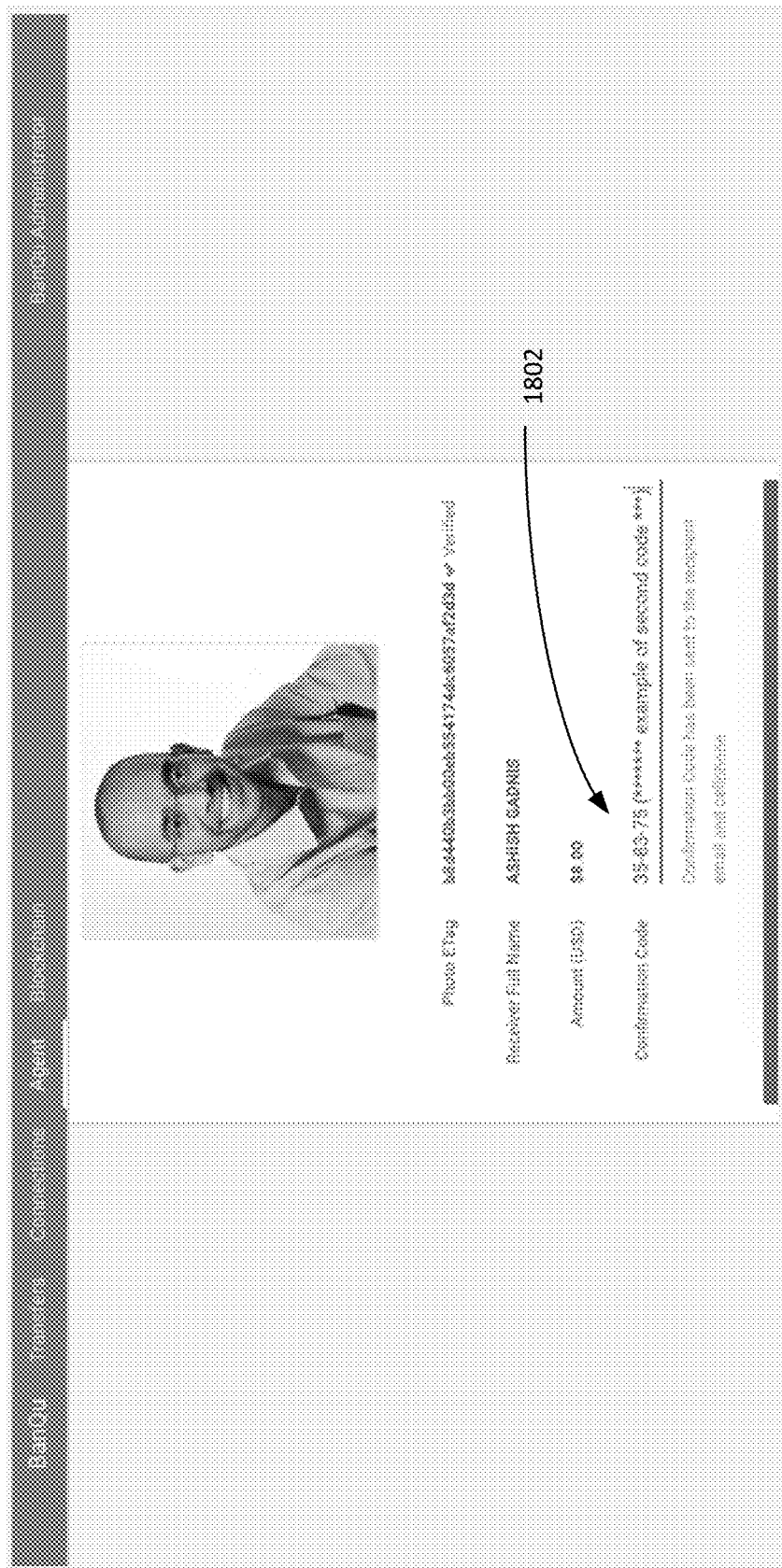

FIG. 18 illustrates a user interface 1800 similar to user interface 1700 of FIG. 17, but additional information is present (indicating a later stage in verification), including second-stage authentication data 1802, shown as a 6-digit code, that has been sent to a recipient's mobile device or account and presented to and entered by a verification agent. In some examples, user interface 1700 of FIG. 17 and user interface 1800 of FIG. 18 are what an agent sees after the first-stage authentication data is determined to be a match (FIG. 17) and after second stage authentication data has been entered by the agent (FIG. 18). The image (identity information 1704) shown in transfer found user interface 1702 can be the decrypted identity information provided to the agent. For example, a verification agent who has entered a 9-digit code is presented with the image of the intended recipient and can (in some examples) confirm that a person in the agent's presence appears to match the image. Confirmation can either be an explicit step, or confirmation can be implicit if the agent enters a second code (or other second stage authentication data that was generated after verification of the first stage authentication data) provided by the person in the agent's presence.

In some examples, after transfer found user interface 1702 is displayed, the agent confirms that the displayed image resembles a person in the agent's presence, and then second-stage authentication data 1802 is generated and sent to the recipient's mobile device and is displayed in user interface 1800. In some examples, confirmation of the person's identity is either not performed or is implicit in the verification agent entering a second code. In some examples, second-stage authentication data 1802 is shown in user interface 1800 at the time second-stage authentication data 1802 is sent to the mobile device of the recipient, and the agent can verify whether or not the person in the agent's presence has provided the correct code. In other examples, the agent is not provided the code, and the agent simply enters what the person in the agent's presence provides, and verification of the code is determined by the platform.

Figure 19:
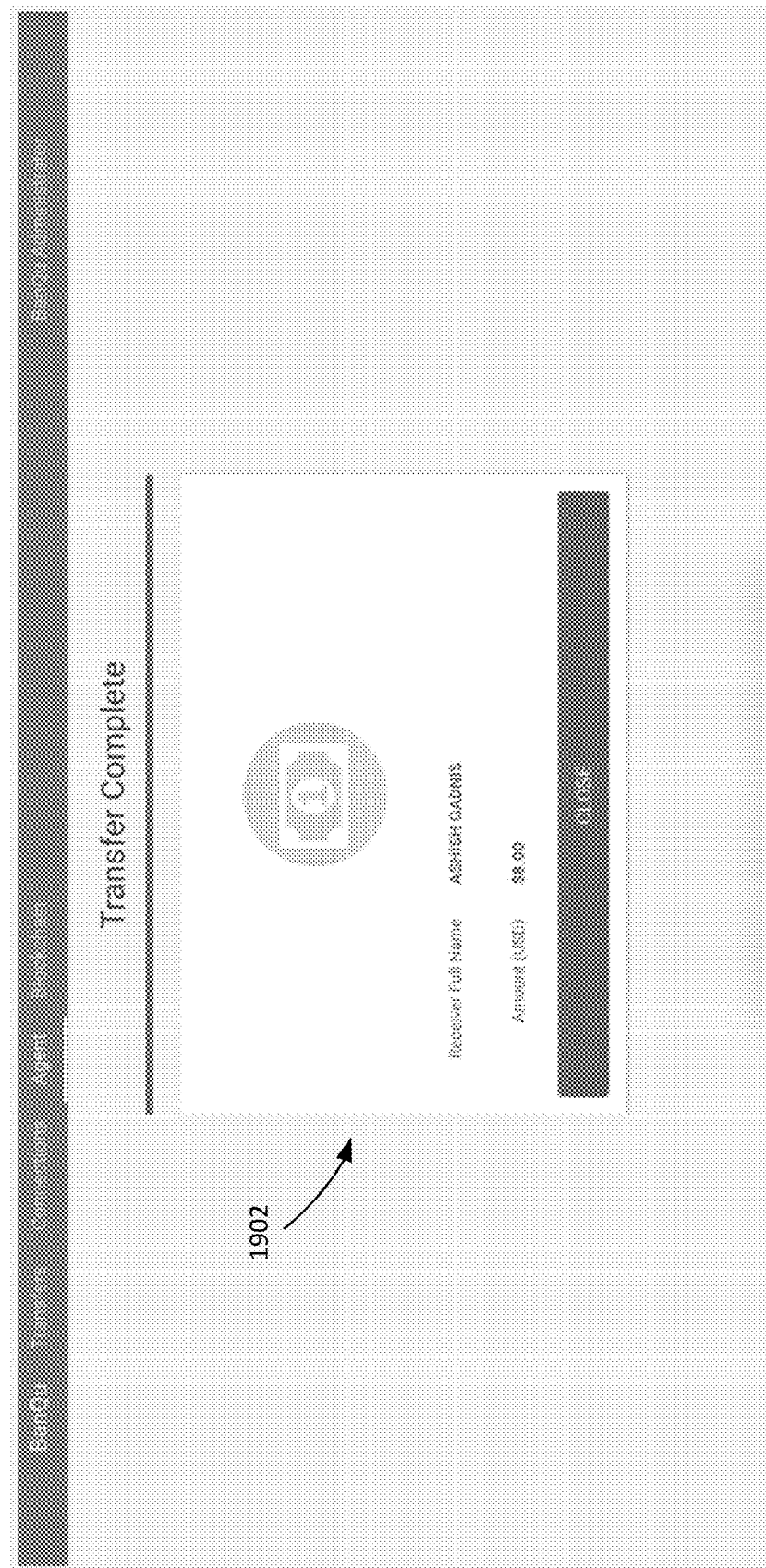

Once the recipient receives the second-stage authentication data 1802 and provides this code to the agent, the agent can either authorize the transaction if there is a match or enter the provided code, and if a match is determined, the agent is notified that the transaction is authorized and/or has been completed, as is shown in transfer complete user interface 1902 of user interface 1900 of FIG. 19.

In user interface 2000 of FIG. 20, blockchain tab 2002 is active. User interface 2000 includes a dashboard view that includes a current block number 2004 in the blockchain where the completed transaction is stored. The dashboard view also includes a browser session information 2006 that indicates how many browsers are currently directly accessing the blockchain at the current point in time and blockchain peer information 2008 that indicates how many blockchain nodes are being accessed in order to display the platform blockchain transactions. Pending view 2010 illustrates the data stored in the current block, including the transaction.

Figure 21:
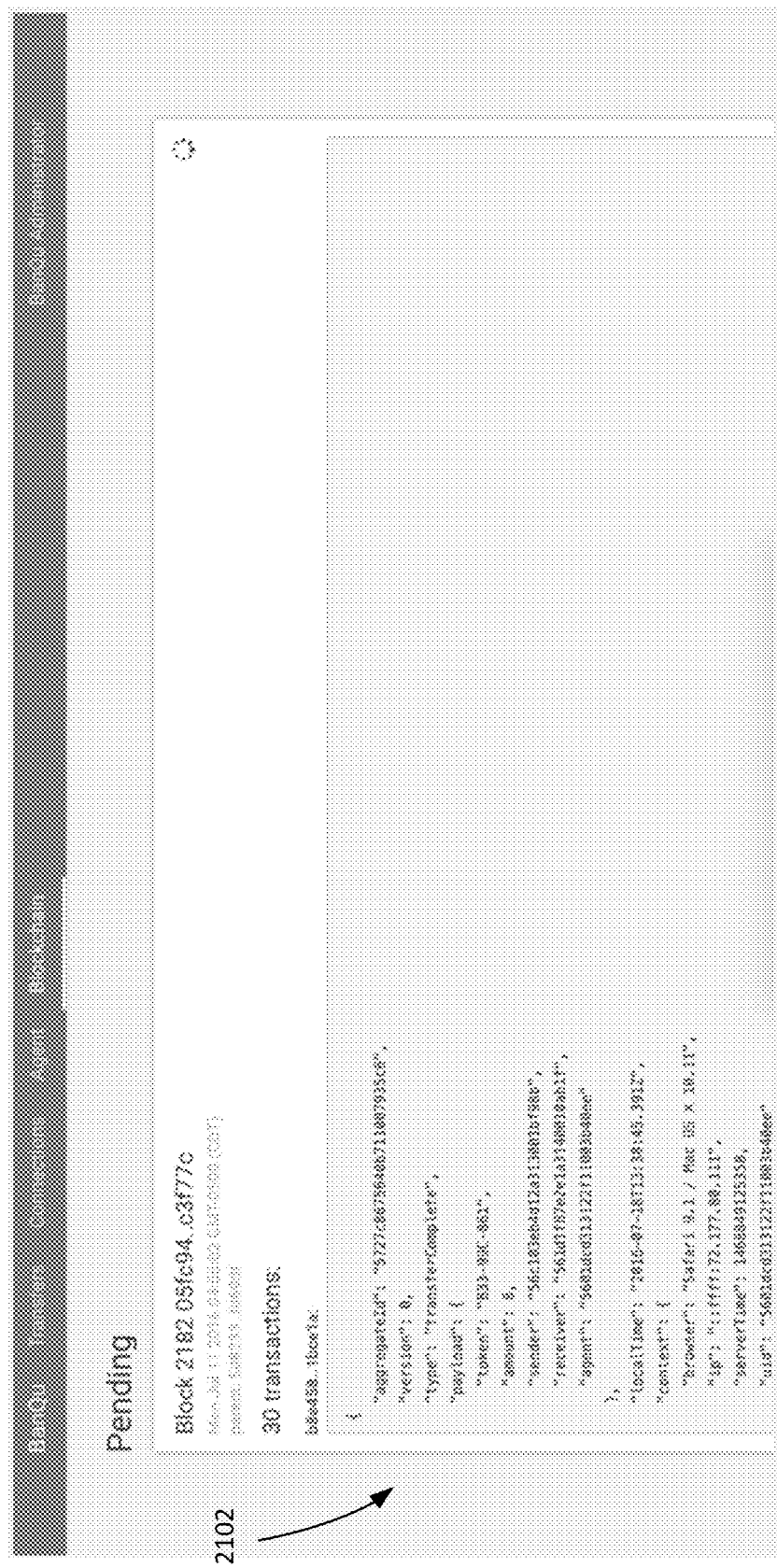

FIG. 21 shows a user interface 2100 in which a pending view 2102 includes a transaction-by-transaction breakdown of what is stored in the current block. Encrypted and hashed data are stored on the blockchain. Each transaction, and the different information describing the transaction, becomes part of the immutable blocks that are stored on the permissioned blockchain (for example, an Ethereum blockchain). The stored information can include the first stage authentication data ("token"), amount transferred ("amount"), as well as sender, receiver, and agent information.

Figure 22:
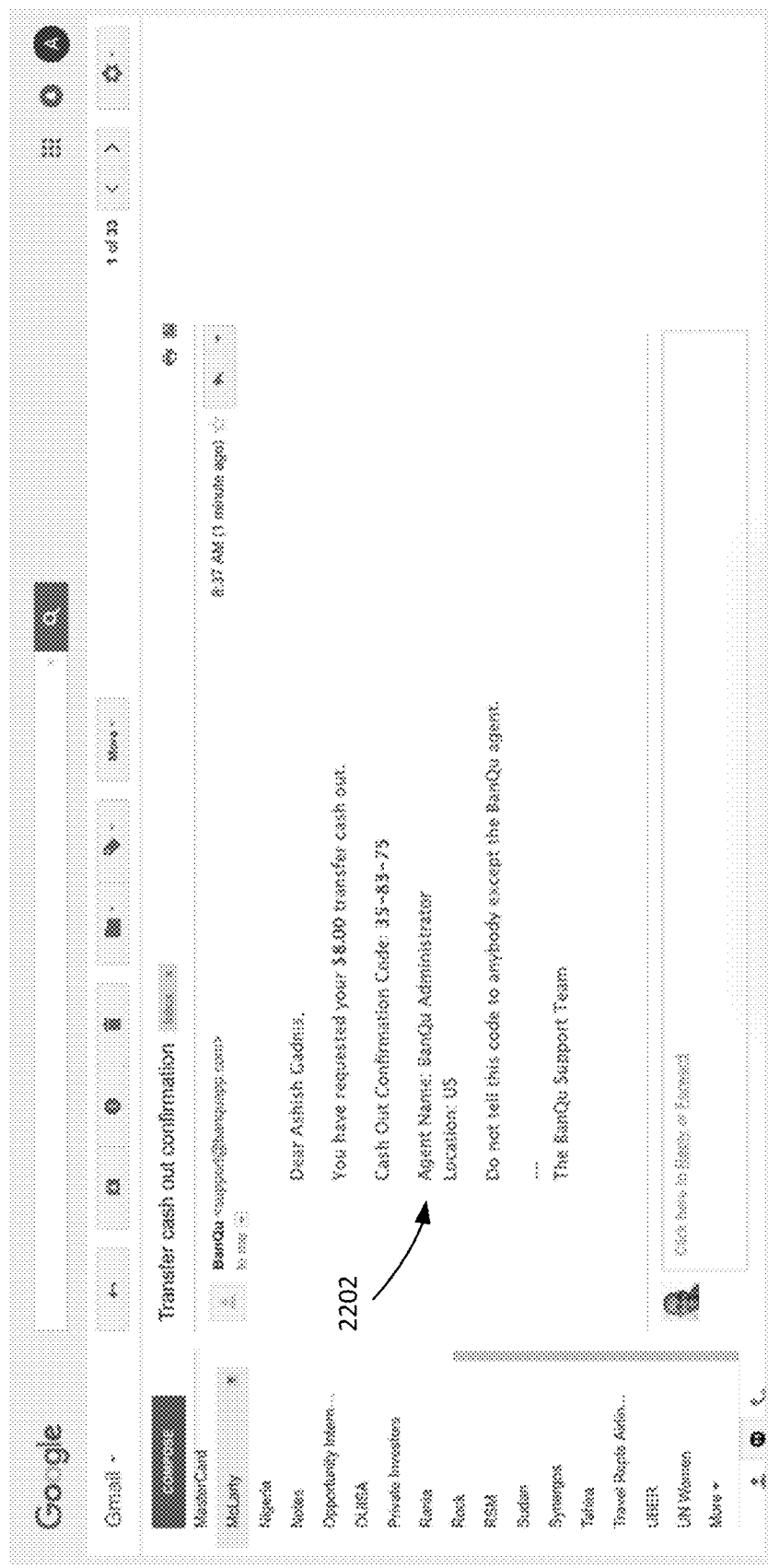

FIG. 22 illustrates a user interface 2200 of an email program in which a message 2202 is sent to the recipient indicating that first-stage authentication data has been provided and including a code (second-stage authentication data) that is to be provided to the verification agent to complete the transaction. In some examples, the second-stage authentication data is sent to a mobile device associated with the recipient, and in other examples, such as that shown in FIG. 22, the second-stage authentication data is sent via email, or message alert sent through a software application associated with the platform.

Figure 23:
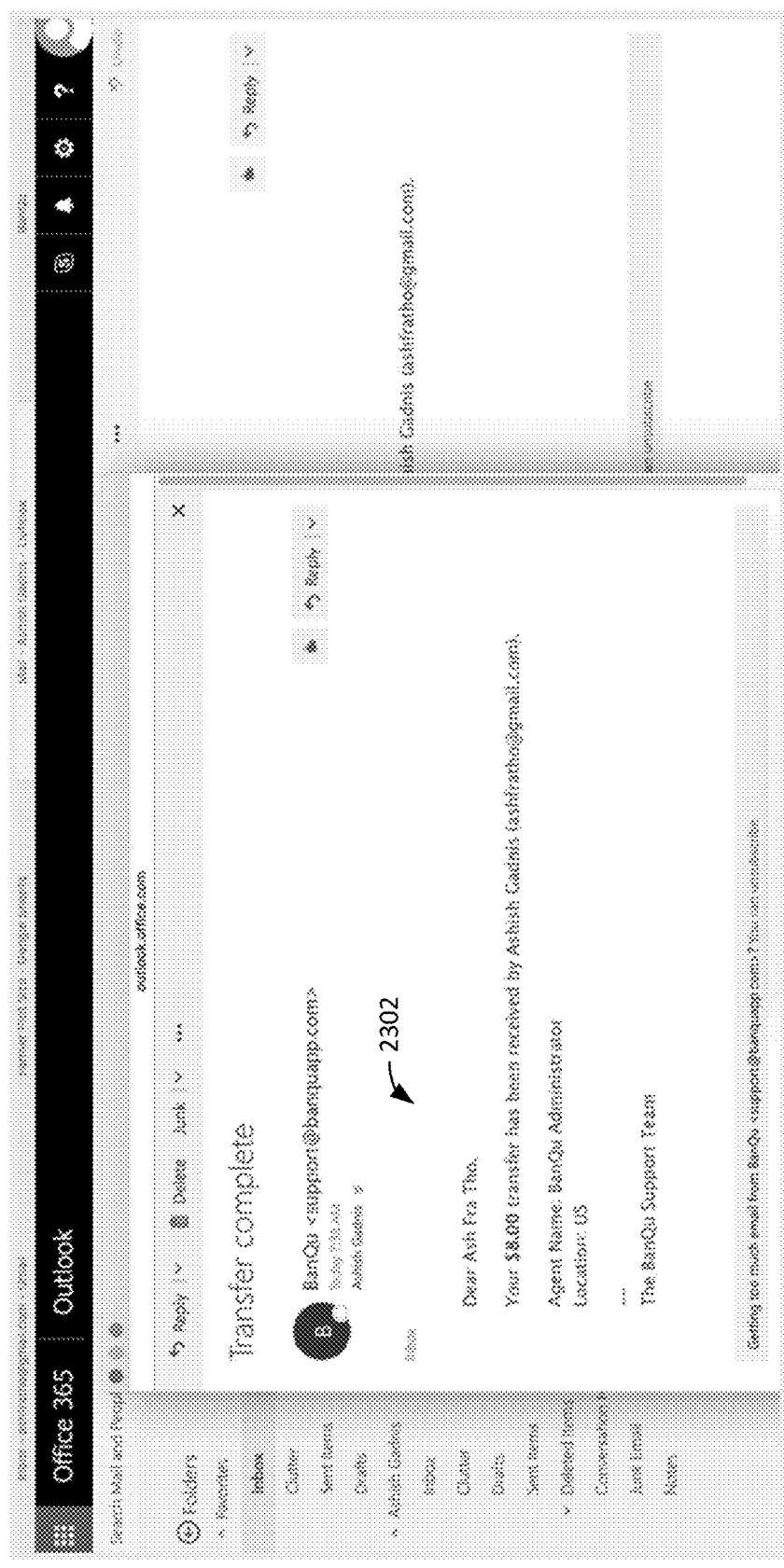

FIG. 23 illustrates a user interface 2300 illustrating a transfer complete email confirmation 2302 provided to the sender after successful completion of a transfer.

The information associated with a user can be stored in different blocks, either pre-defined by the application or created ad-hoc by the user, in the blockchain. To retrieve this information, for example when a user logs in to a web application and the user's profile is presented, a "projection" can be created by searching the blockchain for information associated with the user and retrieving that information. For example, a search based on the user's unique identifier can be performed.

Projections can be created for all information associated with a user's account and/or for different "personas." A user can establish different personas within the user's account that can each include different types and amounts of information.

The user can also establish different logins/login approaches to access the different personas. In some examples, logins of varying levels of security are available, and more secure login approaches (e.g., multi-factor authentication, thumb/fingerprints, etc.) can be used for information the user considers to be more sensitive or confidential, and less secure login approaches (e.g., pin, password, passphrase, etc.) can be used for information the user considers less sensitive or confidential. In some examples, a same login is used for some or all personas. Logins can be used, for example, when a user wishes to share a particular persona with another user or entity.

Figure 27:
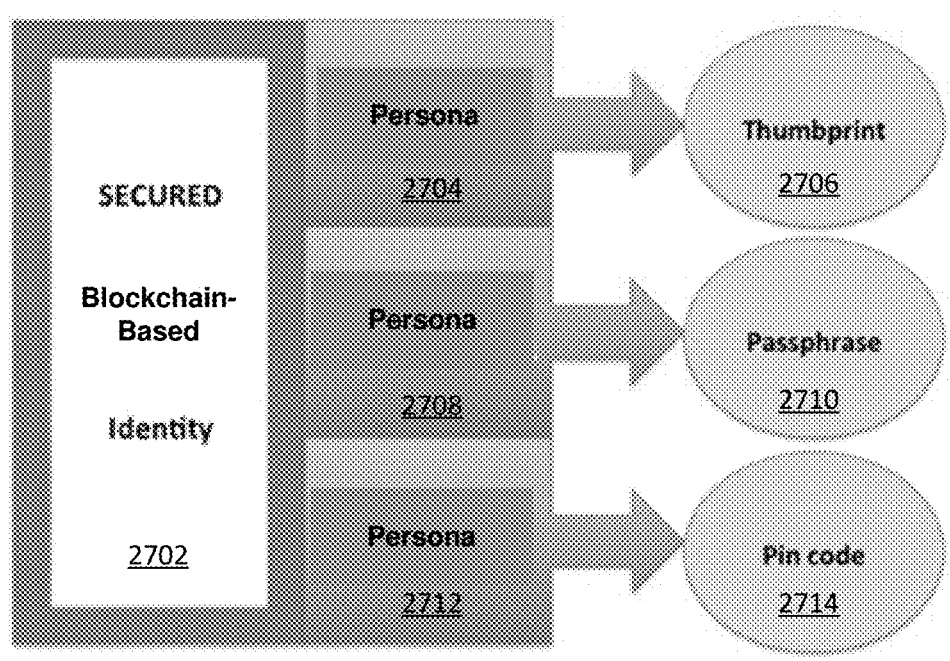
FIG. 27 is a diagram of example personas based on a secured, blockchain-based identity.

Example personas are illustrated in FIG. 27. A secured, blockchain-based identity 2702 (which can be similar to blockchain-based identity 200 of FIG. 2, for example) is stored on one or more blocks in a blockchain. Different personas include or access different aspects of blockchain-based identity 2702. A general or default persona can also be created. The persona approach allows a user to control what information the user is releasing to various institutions and other users and to maintain other data as private. Although particular access methods (thumbprint 2706, passphrase 2710, and PIN code 2714) are shown in FIG. 27 as associated with particular personas, various different access methods can be selected or assigned to any persona.

The secure storage capabilities of the blockchain have been discussed herein, but the blockchain can also be capable of executing code, which can be implemented as "smart contracts," which are programs that are stored on the blockchain and executed on the blockchain.

Pub. No. US 2018/0285879 A1 is hereby incorporated by reference in its entirety.

Example Computing Systems

Figure 24:
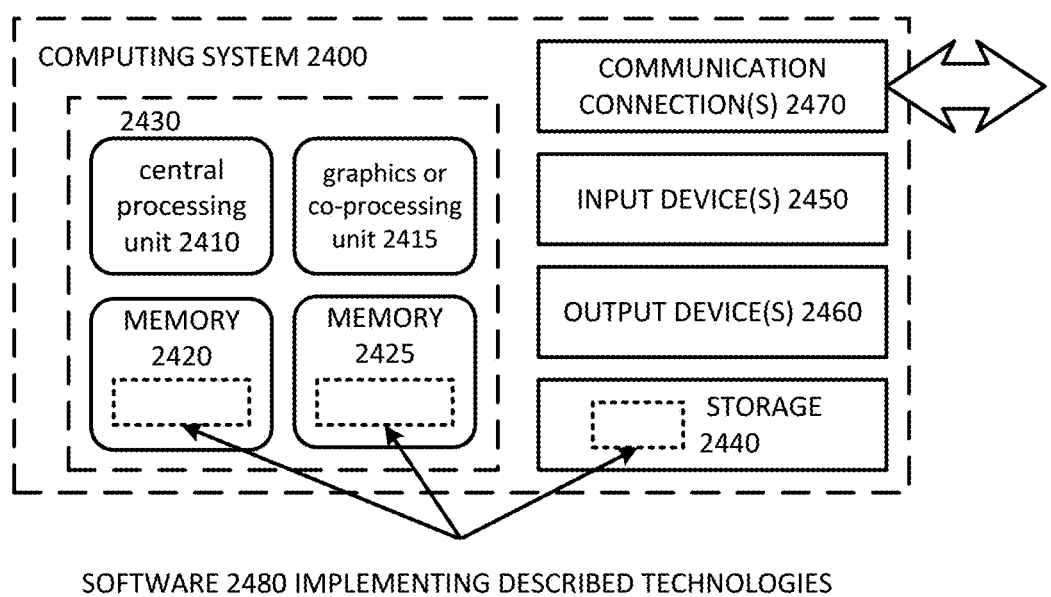
FIG. 24 is a diagram of an example computing system in which some described embodiments can be implemented.

FIG. 24 depicts a generalized example of a suitable computing system 2400 in which the described innovations may be implemented. The computing system 2400 is not intended to suggest any limitation as to scope of use or functionality, as the innovations may be implemented in diverse general-purpose or special-purpose computing systems.

With reference to FIG. 24, the computing system 2400 includes one or more processing units 2410, 2415 and memory 2420, 2425. In FIG. 24, this basic configuration 2430 is included within a dashed line. The processing units 2410, 2415 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 24 shows a central processing unit 2410 as well as a graphics processing unit or co-processing unit 2415. The tangible memory 2420, 2425 may be volatile memory (e.g., registers, cache, RAM), non-volatile memory (e.g., ROM, EEPROM, flash memory, etc.), or some combination of the two, accessible by the processing unit(s). The memory 2420, 2425 stores software 2480 implementing one or more innovations described herein, in the form of computer-executable instructions suitable for execution by the processing unit(s). For example, memory 2420 can store software 2480 implementing enrollment engine 116 and transaction engine 118 of FIG. 1.

A computing system may have additional features. For example, the computing system 2400 includes storage 2440, one or more input devices 2450, one or more output devices 2460, and one or more communication connections 2470. An interconnection mechanism (not shown) such as a bus, controller, or network interconnects the components of the computing system 2400. Typically, operating system software (not shown) provides an operating environment for other software executing in the computing system 2400, and coordinates activities of the components of the computing system 2400.

The tangible storage 2440 may be removable or non-removable, and includes magnetic disks, magnetic tapes or cassettes, CD-ROMs, DVDs, or any other medium which can be used to store information and which can be accessed within the computing system 2400. The storage 2440 stores instructions for the software 2480 implementing one or more innovations described herein.

The input device(s) 2450 may be a touch input device such as a keyboard, mouse, pen, or trackball, a voice input device, a scanning device, or another device that provides input to the computing system 2400. For video encoding, the input device(s) 2450 may be a camera, video card, TV tuner card, or similar device that accepts video input in analog or digital form, or a CD-ROM or CD-RW that reads video samples into the computing system 2400. The output device(s) 2460 may be a display, printer, speaker, CD-writer, or another device that provides output from the computing system 2400.

The communication connection(s) 2470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 25:
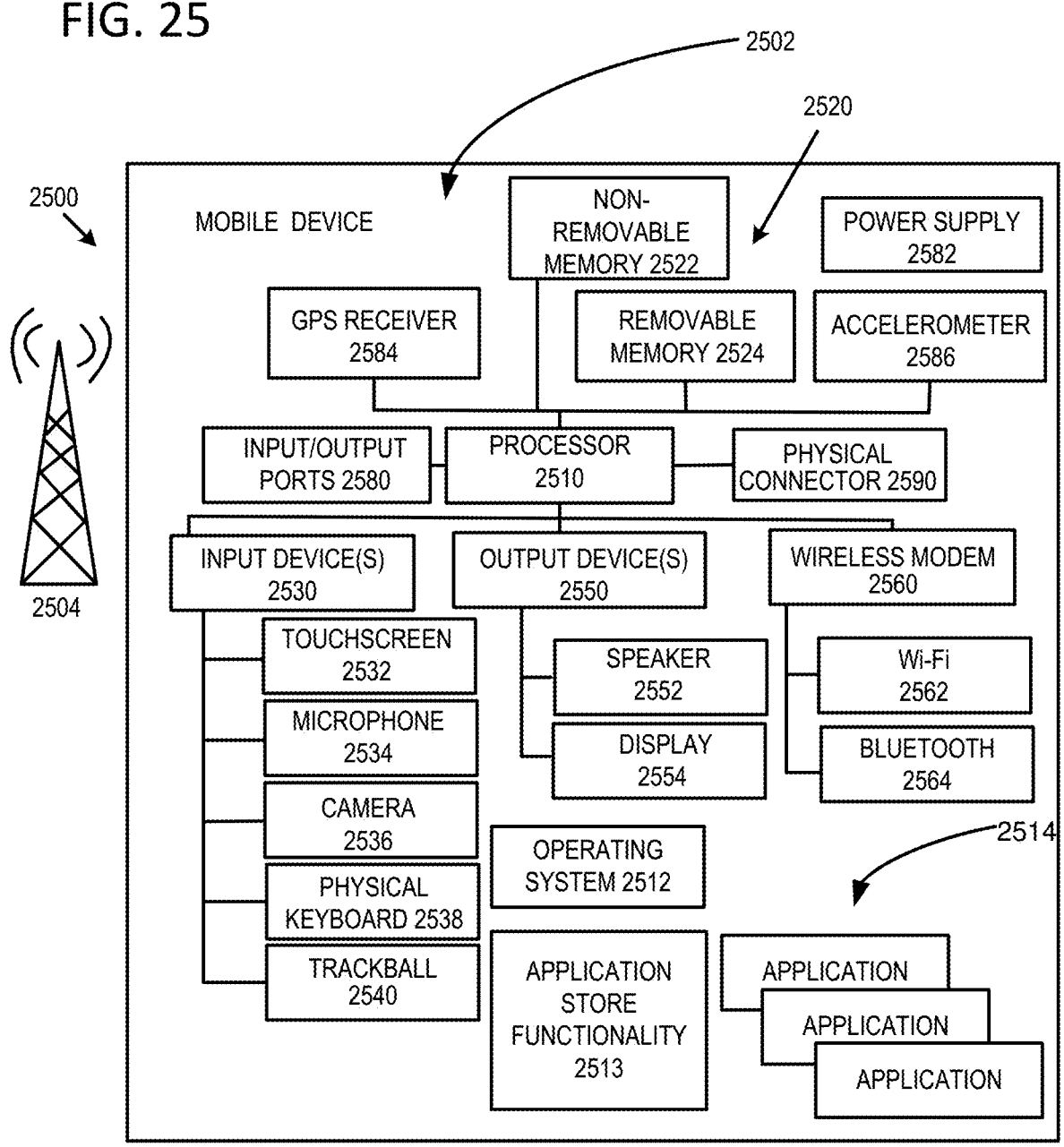
FIG. 25 is an example mobile device that can be used in conjunction with the technologies described herein.

FIG. 25 is a system diagram depicting an example mobile device 2500 including a variety of optional hardware and software components, shown generally at 2502. Any components 2502 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 2504, such as a cellular, satellite, or other network.

The illustrated mobile device 2500 can include a controller or processor 2510 (e.g., signal processor, microprocessor, ASIC, or other control and processing logic circuitry) for performing such tasks as signal coding, data processing, input/output processing, power control, and/or other functions. An operating system 2512 can control the allocation and usage of the components 2502 and support for one or more application programs 2514. The application programs can include common mobile computing applications (e.g., email applications, calendars, contact managers, web browsers, messaging applications), or any other computing application. Functionality 2513 for accessing an application store can also be used for acquiring and updating application programs 2514.

The illustrated mobile device 200 can include memory 2520. Memory 2520 can include non-removable memory 2522 and/or removable memory 2524. The non-removable memory 2522 can include RAM, ROM, flash memory, a hard disk, or other well-known memory storage technologies. The removable memory 2524 can include flash memory or a Subscriber Identity Module (SIM) card, which is well known in GSM communication systems, or other well-known memory storage technologies, such as "smart cards." The memory 2520 can be used for storing data and/or code for running the operating system 2512 and the applications 2514. Example data can include web pages, text, images, sound files, video data, or other data sets to be sent to and/or received from one or more network servers or other devices via one or more wired or wireless networks. The memory 2520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The memory 2520 can store instructions or code implementing enrollment engine 116 and transaction engine 118 of FIG. 1.

The mobile device 2500 can support one or more input devices 2530, such as a touchscreen 2532, microphone 2534, camera 2536, physical keyboard 2538 and/or trackball 2540 and one or more output devices 2550, such as a speaker 2552 and a display 2554. Other possible output devices (not shown) can include piezoelectric or other haptic output devices. Some devices can serve more than one input/output function. For example, touchscreen 2532 and display 2554 can be combined in a single input/output device.

The input devices 2530 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 2512 or applications 2514 can comprise speech-recognition software as part of a voice user interface that allows a user to operate the device 2500 via voice commands. Further, the device 2500 can comprise input devices and software that allows for user interaction via a user's spatial gestures, such as detecting and interpreting gestures to provide input to a gaming application.

A wireless modem 2560 can be coupled to an antenna (not shown) and can support two-way communications between the processor 2510 and external devices, as is well understood in the art. The modem 2560 is shown generically and can include a cellular modem for communicating with the mobile communication network 2504 and/or other radio-based modems (e.g., Bluetooth 2564 or Wi-Fi 2562). The wireless modem 2560 is typically configured for communication with one or more cellular networks, such as a GSM network for data and voice communications within a single cellular network, between cellular networks, or between the mobile device and a public switched telephone network (PSTN).

The mobile device can further include at least one input/output port 2580, a power supply 2582, a satellite navigation system receiver 2584, such as a Global Positioning System (GPS) receiver, an accelerometer 2586, and/or a physical connector 2590, which can be a USB port, IEEE 1394 (Fire Wire) port, and/or RS-232 port. The illustrated components 2502 are not required or all-inclusive, as any components can be deleted and other components can be added.

Example Cloud-Supported Environments

Figure 26:
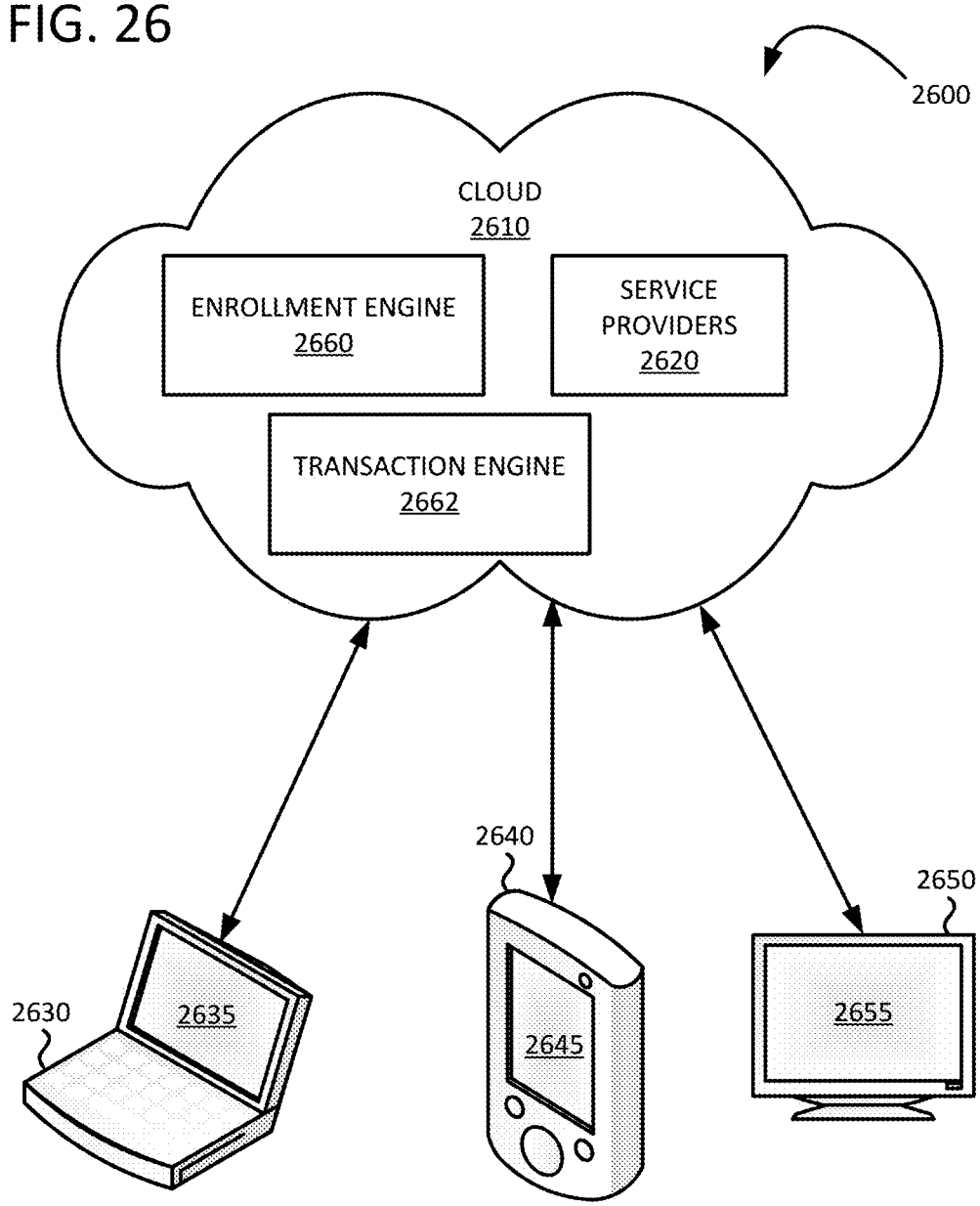
FIG. 26 is an example cloud-supported environment that can be used in conjunction with the technologies described herein.

FIG. 26 illustrates a generalized example of a suitable cloud-supported environment 2600 in which described embodiments, techniques, and technologies may be implemented. In the example environment 2600, various types of services (e.g., computing services) are provided by a cloud 2610. For example, the cloud 2610 can comprise a collection of computing devices, which may be located centrally or distributed, that provide cloud-based services to various types of users and devices connected via a network such as the Internet. The implementation environment 2600 can be used in different ways to accomplish computing tasks. For example, some tasks (e.g., processing user input and presenting a user interface) can be performed on local computing devices (e.g., connected devices 2630, 2640, 2650) while other tasks (e.g., storage of data to be used in subsequent processing) can be performed in the cloud 2610.

In example environment 2600, the cloud 2610 provides services for connected devices 2630, 2640, 2650 with a variety of screen capabilities. Connected device 2630 represents a device with a computer screen 2635 (e.g., a mid-size screen). For example, connected device 2630 could be a personal computer such as desktop computer, laptop, notebook, netbook, or the like. Connected device 2640 represents a device with a mobile device screen 2645 (e.g., a small size screen). For example, connected device 2640 could be a mobile phone, smart phone, personal digital assistant, tablet computer, and the like. Connected device 2650 represents a device with a large screen 2655. For example, connected device 2650 could be a television screen (e.g., a smart television) or another device connected to a television (e.g., a set-top box or gaming console) or the like. One or more of the connected devices 2630, 2640, 2650 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2600. For example, the cloud 2610 can provide services for one or more computers (e.g., server computers) without displays.

Services can be provided by the cloud 2610 through service providers 2620, or through other providers of online services (not depicted). For example, cloud services can be customized to the screen size, display capability, and/or touchscreen capability of a particular connected device (e.g., connected devices 2630, 2640, 2650).

In example environment 2600, the cloud 2610 provides the technologies and solutions described herein to the various connected devices 2630, 2640, 2650 using, at least in part, the service providers 2620. For example, the service providers 2620 can provide a centralized solution for various cloud-based services. The service providers 2620 can manage service subscriptions for users and/or devices (e.g., for the connected devices 2630, 2640, 2650 and/or their respective users). Some or all of the functionality of enrollment engine 2660 and transaction engine 2662, which can be similar to enrollment engine 116 and transaction engine 118 of FIG. 1, can be implemented in the cloud 2610.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 24, computer-readable storage media include memory 2420 and 2425, and storage 2440. By way of example and with reference to FIG. 25, computer-readable storage media include memory and storage 2520, 2522, and 2524. The term computer-readable storage media does not include signals and carrier waves. In addition, the term computer-readable storage media does not include communication connections (e.g., 2470, 2560, 2562, and 2564).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. In a computer system, a method comprising:
    enrolling a user in a computer-implemented authentication platform, wherein the enrolling the user comprises establishing a user profile of the user, the enrolling further comprising:
        receiving an image of the user;
        digitally encrypting the image of the user to provide a digitally encrypted image;
        storing the digitally encrypted image of the user in a blockchain as part of the user profile of the user;
        generating, using the digitally encrypted image of the user, an identifier of the user; and
        storing the identifier of the user in the blockchain as part of the user profile of the user; and
    authenticating the user in the computer-implemented authentication platform, wherein the authenticating the user comprises:
        receiving the identifier of the user;
        generating first authentication data;
        transmitting the first authentication data to a mobile device of the user;
        receiving a first indication that the first authentication data has been provided to a verification agent computing device, the first indication including the first authentication data;
        verifying that the first authentication data from the first indication matches the first authentication data generated and transmitted to the mobile device of the user;
        in response to the verifying that the first indication matches the first authentication data, retrieving the digitally encrypted image of the user from the blockchain, including using the identifier of the user to retrieve the digitally encrypted image of the user;
        requesting a decryption token from an encryption service;

receiving, from the encryption service, the decryption token;
decrypting the digitally encrypted image of the user using the decryption token to provide a decrypted image of the user;
transmitting the decrypted image of the user to the verification agent computing device;
receiving user input or a result of an image analysis process confirming that the decrypted image of the user matches a person in the presence of the verification agent;
generating second authentication data;
transmitting the second authentication data to the mobile device of the user;
receiving a second indication that the second authentication data has been provided to the verification agent computing device, the second indication including the second authentication data; and
verifying that the second authentication data from the second indication matches the second authentication data generated and transmitted to the mobile device of the user.

2. The method of claim 1, wherein the identifier of the user is a public key corresponding to the digitally encrypted image.

3. The method of claim 1, wherein the first authentication data is a first authentication token, and wherein the second authentication token is a second authentication token.

4. The method of claim 1, wherein the blockchain is permissioned blockchain.

5. A computer system comprising one or more processing units and memory, wherein the computer system is configured to perform operations comprising:
enrolling a user in a computer-implemented authentication platform, wherein the enrolling the user comprises establishing a user profile of the user, the enrolling further comprising:
receiving an image of the user;
digitally encrypting the image of the user to provide a digitally encrypted image;
storing the digitally encrypted image of the user in a blockchain as part of the user profile of the user;
generating, using the digitally encrypted image of the user, an identifier of the user; and
storing the identifier of the user in the blockchain as part of the user profile of the user; and
authenticating the user in the computer-implemented authentication platform, wherein the authenticating the user comprises:
receiving the identifier of the user;
generating first authentication data;
transmitting the first authentication data to a mobile device of the user;
receiving a first indication that the first authentication data has been provided to a verification agent computing device, the first indication including the first authentication data;
verifying that the first authentication data from the first indication matches the first authentication data generated and transmitted to the mobile device of the user;
in response to the verifying that the first indication matches the first authentication data, retrieving the digitally encrypted image of the user from the blockchain, including using the identifier of the user to retrieve the digitally encrypted image of the user;

decrypting the digitally encrypted image of the user using a decryption token to provide a decrypted image of the user;
transmitting the decrypted image of the user to the verification agent computing device;
receiving user input or a result of an image analysis process confirming that the decrypted image of the user matches a person in the presence of the verification agent;
generating second authentication data;
transmitting the second authentication data to the mobile device of the user;
receiving a second indication that the second authentication data has been provided to the verification agent computing device, the second indication including the second authentication data; and
verifying that the second authentication data from the second indication matches the second authentication data generated and transmitted to the mobile device of the user.

6. The computer system of claim 5, wherein the identifier of the user is a public key corresponding to the digitally encrypted image.

7. The computer system of claim 5, wherein the first authentication data is a first authentication token, and wherein the second authentication token is a second authentication token.

8. The computer system of claim 5, wherein the blockchain is permissioned blockchain.

9. The computer system of claim 5, wherein the authenticating the user further comprises:
requesting the decryption token from an encryption service; and
receiving, from the encryption service, the decryption token.

10. One or more non-transitory computer-readable media having stored thereon computer-executable instructions for causing a computer system, when programmed thereby, to perform operations comprising:
enrolling a user in a computer-implemented authentication platform, wherein the enrolling the user comprises establishing a user profile of the user, the enrolling further comprising:
receiving identity information of the user;
digitally encrypting the identity information of the user to provide digitally encrypted identity information;
storing the digitally encrypted identity information of the user in a blockchain as part of the user profile of the user;
generating, using the digitally encrypted identity information of the user, an identifier of the user; and
storing the identifier of the user in the blockchain as part of the user profile of the user; and
authenticating the user in the computer-implemented authentication platform, wherein the authenticating the user comprises:
receiving the identifier of the user;
generating first authentication data;
transmitting the first authentication data to a mobile device of the user;
receiving a first indication that the first authentication data has been provided to a verification agent computing device, the first indication including the first authentication data;

verifying that the first authentication data from the first indication matches the first authentication data generated and transmitted to the mobile device of the user;

in response to the verifying that the first indication matches the first authentication data, retrieving the digitally encrypted identity information of the user from the blockchain, including using the identifier of the user to retrieve the digitally encrypted identity information of the user;

decrypting the digitally encrypted identity information of the user using a decryption token to provide decrypted identity information of the user;

transmitting the decrypted identity information of the user to the verification agent computing device;

receiving input confirming that the decrypted identity information of the user matches identity information of a person in the presence of the verification agent;

generating second authentication data;

transmitting the second authentication data to the mobile device of the user;

receiving a second indication that the second authentication data has been provided to the verification agent computing device, the second indication including the second authentication data; and verifying that the second authentication data from the second indication matches the second authentication data generated and transmitted to the mobile device of the user.

11. The one or more computer-readable media of claim 10, wherein the identifier of the user is a public key corresponding to the digitally encrypted identity information.

12. The one or more computer-readable media of claim 10, wherein the first authentication data is a first authentication token, and wherein the second authentication token is a second authentication token.

13. The one or more computer-readable media of claim 10, wherein the blockchain is permissioned blockchain.

14. The one of more computer-readable media of claim 10, wherein the identity information is an image of the user.

15. The one of more computer-readable media of claim 10, wherein the authenticating the user further comprises:
requesting the decryption token from an encryption service; and
receiving, from the encryption service, the decryption token.

* * * * *